(12) United States Patent
Tachibana et al.

(10) Patent No.: US 9,322,734 B2
(45) Date of Patent: Apr. 26, 2016

(54) TIRE TESTING APPARATUS

(71) Applicant: MITSUBISHI HEAVY INDUSTRIES MACHINERY TECHNOLOGY CORPORATION, Hiroshima-shi, Hiroshima (JP)

(72) Inventors: Makoto Tachibana, Hiroshima (JP); Jiro Agawa, Hiroshima (JP); Morihiro Imamura, Hiroshima (JP); Tatsuya Ueda, Hiroshima (JP); Yoshinori Miyamoto, Hiroshima (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 299 days.

(21) Appl. No.: 13/980,766

(22) PCT Filed: Dec. 19, 2012

(86) PCT No.: PCT/JP2012/082914
§ 371 (c)(1),
(2) Date: Jul. 19, 2013

(87) PCT Pub. No.: WO2013/121675
PCT Pub. Date: Aug. 22, 2013

(65) Prior Publication Data
US 2014/0060181 A1 Mar. 6, 2014

(30) Foreign Application Priority Data
Feb. 17, 2012 (JP) ................................ 2012-032779

(51) Int. Cl.
*G01M 17/02* (2006.01)
*G01M 1/04* (2006.01)
(Continued)

(52) U.S. Cl.
CPC ............... *G01M 1/045* (2013.01); *B60C 19/00* (2013.01); *B60C 99/00* (2013.01); *G01M 17/021* (2013.01); *G01M 1/14* (2013.01)

(58) Field of Classification Search
CPC ....... G01M 1/14; G01M 17/021; G01M 1/045; B60C 99/00; B60C 19/00
USPC ..................................................... 73/146, 460
See application file for complete search history.

(56) References Cited

U.S. PATENT DOCUMENTS

| 3,043,130 A | 7/1962 | Patterson |
| 4,763,710 A | 8/1988 | Pielach |

(Continued)

FOREIGN PATENT DOCUMENTS

| CN | 1510408 A | 7/2004 |
| CN | 1573063 A | 2/2005 |

(Continued)

OTHER PUBLICATIONS

Office Action mailed Oct. 14, 2014, corresponding to Taiwanese patent application No. 101149804.
(Continued)

*Primary Examiner* — Laura Martin
*Assistant Examiner* — Suman K Nath
(74) *Attorney, Agent, or Firm* — Kanesaka Berner and Partners LLP

(57) ABSTRACT

A tire testing apparatus allows attachment and detachment of a rim assembly in which first and second rims are integrated and performs testing of a tire attached to the rim assembly. The tire testing apparatus includes a first attaching part; a second attaching part; a rotating part that rotates the first attaching part around a reference axis orthogonal to the first reference surface of the first rim attached to the first attaching part; a fixing part that fixes the first attaching part and the second attaching part to each other and is capable of releasing the fixation; an attaching portion moving part that adjusts the distance in a direction along the reference axis between the first attaching part and the second attaching part; and a rotation regulating part that regulates rotation of the second attaching part around the reference axis.

4 Claims, 26 Drawing Sheets

(51) Int. Cl.
  *B60C 19/00* (2006.01)
  *B60C 99/00* (2006.01)
  *G01M 1/14* (2006.01)

(56) References Cited

U.S. PATENT DOCUMENTS

| | | | |
|---|---|---|---|
| 5,052,218 A | 10/1991 | Iwama | |
| 6,237,402 B1 | 5/2001 | Reese | |
| 6,308,566 B1* | 10/2001 | Matsumoto | G01M 1/045 73/146 |
| 7,357,170 B2* | 4/2008 | Hirata | B60B 25/00 157/1.35 |
| 2001/0032499 A1 | 10/2001 | Jenniges et al. | |
| 2007/0220964 A1* | 9/2007 | Shinomoto | G01M 17/021 73/146 |
| 2011/0226050 A1* | 9/2011 | Nakayama | G01M 17/021 73/146 |

FOREIGN PATENT DOCUMENTS

| | | | | |
|---|---|---|---|---|
| CN | 2690875 | Y | 4/2005 | |
| CN | 1720426 | A | 1/2006 | |
| CN | 2893681 | Y | 4/2007 | |
| CN | 101038227 | A | 9/2007 | |
| CN | 201225958 | Y | 4/2009 | |
| DE | 69828384 | T2 | 12/2005 | |
| JP | 6071237 | A | 4/1985 | |
| JP | 62135937 | U | 8/1987 | |
| JP | 63232009 | A | 9/1988 | |
| JP | 2171633 | A | 7/1990 | |
| JP | 347742 | A | 2/1991 | |
| JP | 2661753 | B2 | 4/1991 | |
| JP | 3110138 | A | 5/1991 | |
| JP | 3231834 | A | 10/1991 | |
| JP | 3040514 | B2 | 11/1992 | |
| JP | 08118509 | A * | 5/1996 | B29D 30/08 |
| JP | 970833 | A | 3/1997 | |
| JP | 3672135 | B2 | 2/1998 | |
| JP | 200651791 | A | 2/2006 | |
| JP | 2007171208 | A * | 7/2007 | G01M 1/02 |
| JP | 2011174839 | A | 9/2011 | |
| JP | 2013-104744 | A | 5/2013 | |
| TW | M418285 | U1 | 12/2011 | |

OTHER PUBLICATIONS

International Search Report for PCT/JP2012/082914 mailed Mar. 19, 2013.
Written Opinion for PCT/JP2012/082914 mailed Mar. 19, 2013.
Office Action dated Mar. 12, 2015, corresponding to German patent application No. 112012005891.7.
Office Action dated Mar. 24, 2015, corresponding to Chinese patent application No. 201280006702.X.
Notice of Allowance mailed Apr. 21, 2015, corresponding to Japanese patent application No. 2012-032779.

* cited by examiner

TIRE TESTING APPARATUS

CROSS-REFERENCE TO RELATED APPLICATION

This application is a National Stage of PCT international application Ser. No. PCT/JP2012/082914 filed on Dec. 19, 2012 which designates the United States, and which is based upon and claims the benefit of priority from Japanese Patent Applications No. 2012-032779, filed on Feb. 17, 2012.

TECHNICAL FIELD

The present invention relates to a tire testing apparatus.
Priority is claimed on Japanese Patent Application No. 2012-032779, filed Feb. 17, 2012, the content of which is incorporated herein by reference.

BACKGROUND ART

As tire testing apparatuses, there is a tire uniformity measuring apparatus that measures the uniformity of a tire, and a tire balance measuring apparatus that measures the balance of a tire. In measurement by the tire testing apparatuses, a rim assembly to which a tire that is a test object is attached is replaced for every type of tire according to bead diameter or bead width.

Generally, the rim assembly is used by combining a lower rim (first rim) and an upper rim (second rim) that are attachable to and detachable from each other. The lower rim and the upper rim are formed in a substantially columnar shape or a substantially disk shape, respectively.

In order for the types of tires as measurement objects to cope with a number of cases, methods for automatically replacing the rim assembly for the purpose of shortening the replacement time of the rim assembly or saving replacement work have been proposed. Inventions regarding rim replacing apparatuses are disclosed in Patent Documents 1 to 3.

PRIOR ART DOCUMENT

Patent Document

Patent Document 1: Japanese Patent No. 2661753
Patent Document 2: Japanese Unexamined Patent Application, First Publication No. H03-110138
Patent Document 3: Japanese Patent No. 3672135

SUMMARY OF INVENTION

Problem to be Solved by the Invention

For example, when the rim assembly is stored, a bayonet type joining part may be used in order to connect the lower rim and the upper rim. This joining part is constituted by, for example, a claw (pin) provided on the lower rim and a receiving portion (protruding portion) provided in the upper rim and engaged with the claw. By inserting the claw into the upper rim and twisting the rims, a tip portion of the claw engages the receiving portion, and the rims are connected together. By connecting the rims together in this way, for example, even if only the upper rim is gripped, and lifted and lowered by a lifting and lowering device, the lower rim can be moved together with the upper rim because the lower rim is hung from the upper rim by the joining part.

When a tire is attached to the tire testing apparatus and is tested, the aforementioned joining part is not used in order to reduce the burden of the claw and the receiving portion. By fixing a first attaching part to which the lower rim is attached and a second attaching part to which the upper rim is attached by the fixing part, the rims may be indirectly fixed to each other.

When the rim assembly is replaced, the fixation by the fixing part is released, and either the lower rim or the upper rim is rotated around the axis of the rim assembly so that the receiving portion does not face the claw. Then, after the rims are brought close to each other, the lower rim and the upper rim are rotated relative to each other around the axis, and the claw is engaged with the receiving portion.

However, if releasing of the fixation by the fixing part becomes insufficient for any reason, even if only one of the lower rim and the upper rim is rotated due to a frictional force that acts within the fixing part, the other rim also rotates together with the one rim. For example, even if a fixing mechanism that advances and retracts along the horizontal surface is used, co-rotation of the other rim occurs. For this reason, it is difficult to adjust the relative position of the lower rim and the upper rim around the axis.

An object of the invention is to provide a tire testing apparatus that prevents a second rim from rotating together with a first rim when the first rim is rotated around an axis in a state where fixation by a fixing part is released.

Means for Solving the Problem

According to a first aspect of the present invention, there is provided a tire testing apparatus that allows attachment and detachment of a rim assembly and performs testing of a tire attached to the rim assembly, wherein the rim assembly includes a first rim having a pin that is erected from a first reference surface and has a groove portion formed around an outer peripheral surface thereof, and a second rim having a protruding portion that is provided on a second reference surface and is engageable with the groove portion, and wherein the protruding portion is engaged with the groove portion as the first and second rims are rotated relative to each other in a state where the second reference surface is caused to face the first reference surface. The tire testing apparatus includes a first attaching part that holds the first rim; a second attaching part that holds the second rim so that the second reference surface faces the first reference surface of the first rim attached to the first attaching part; a rotating part that rotates the first attaching part around a reference axis orthogonal to the first reference surface of the first rim attached to the first attaching part; a fixing part that fixes the first attaching part and the second attaching part to each other and is capable of releasing a fixation of the first attaching part and the second attaching part; an attaching portion moving part that adjusts the distance in a direction along the reference axis between the first attaching part and the second attaching part; and a rotation regulating part that regulates rotation of the second attaching part around the reference axis and is capable of releasing a regulation of the second attaching part.

According to a second aspect of the present invention, there is provided a tire testing apparatus that allows attachment and detachment of a rim assembly and performs testing of a tire attached to the rim assembly, wherein the rim assembly includes a first rim having a protruding portion that is provided on a first reference surface, and a second rim having a pin that is erected from a second reference surface and has a groove portion engageable with the protruding portion formed around an outer peripheral surface thereof, and wherein the protruding portion is engaged with the groove portion as the first and second rims are rotated relative to each other in a state where the second reference surface is caused to face the first reference surface. The tire testing apparatus includes a first attaching part that holds the first rim; a second attaching part that holds the second rim so that the second reference surface faces the first reference surface of the first rim attached to the first attaching part; a rotating part that rotates the first attaching part around a reference axis orthogonal to the first reference surface of the first rim attached to the first attaching part; a fixing part that fixes the first attaching part and the second attaching part to each other and is capable of releasing a fixation of the first attaching part and the second attaching part; an attaching portion moving part that adjusts the distance in a direction along the reference axis between the first attaching part and the second attaching part; and a rotation regulating part that regulates rotation of the second attaching part around the reference axis and is capable of releasing a regulation of the second attaching part.

According to the present invention, the first rim is attached to the first attaching part, and the second rim is attached to the second attaching part. The attaching parts can be fixed to each other by the fixing part in a state where the first reference surface and the second reference surface are made to face each other.

On the other hand, when the fixation by the fixing part is released, the first attaching part is rotated around the reference axis by the rotating part in a state where the rotation of the second attaching part around the reference axis is regulated by the rotation regulating part. Thereby, the first rim attached to the first attaching part can be rotated around the reference axis while fixing the second rim attached to the second attaching part. Then, the first attaching part and the second attaching part are brought close to each other by the attaching portion moving part after the first attaching part is rotated so that the protruding portion does not face the pin. By rotating the first attaching part around the reference axis by the rotating part, the protruding portion can be engaged with the groove portion and the first rim can be attached to the second rim.

According to a third aspect of the tire testing apparatus of the present invention, in the first or second aspect, it is more preferable that the rotation regulating part have an engaging portion provided in the second attaching part; a portion to be engaged that is capable of being engaged with the engaging portion in a circumferential direction; and an engaging portion moving part that advances and retracts the portion to be engaged with respect to the engaging portion.

According to the present invention, the second attaching part can be freely rotated around the reference axis by retracting the portion to be engaged from the engaging portion by the engaging portion moving part. On the other hand, the rotation of the second attaching part around the reference axis can be regulated by bringing the portion to be engaged close to the engaging portion by the engaging portion moving part so as to engage the portion to be engaged and the engaging portion with each other in the circumferential direction. In this way, whether the rotation of the second attaching part is regulated or not can be easily switched by adjusting the position of the portion to be engaged.

According to a fourth aspect of the tire testing apparatus of the present invention, in any of the first to third aspects, it is more preferable to further include a first detecting part that detects the position of the first attaching part around the reference axis; and a second detecting part that detects the position of the second attaching part around the reference axis.

According to the present invention, when the first attaching part is rotated around the reference axis by the rotating part in a state where the attaching parts are fixed to each other by the fixing part, the second detecting part can detect the positions of the first rim and the second rim around the reference axis in a state where the first rim and second rim are integrated.

When the fixation by the fixing part is released, and the first attaching part is rotated around the reference axis by the rotating part in a state where the rotation of the second attaching part around the reference axis is regulated by the rotation regulating part, the position of the first attaching part around the reference axis can be detected by the first detecting part.

Effect of the Invention

According to the tire testing apparatus of the present invention, it is possible to prevent the second rim from rotating together with the first rim when the first rim is rotated around the axis in a state where the fixation by the fixing part is released.

DESCRIPTION OF EMBODIMENTS

An embodiment of a tire testing apparatus according to the present invention will be described referring to FIGS. 1 to 26.

In the following embodiment, a case where the tire testing apparatus is a tire uniformity measuring apparatus (hereinafter abbreviated as "tire measuring apparatus") will be described.

Figure 1:
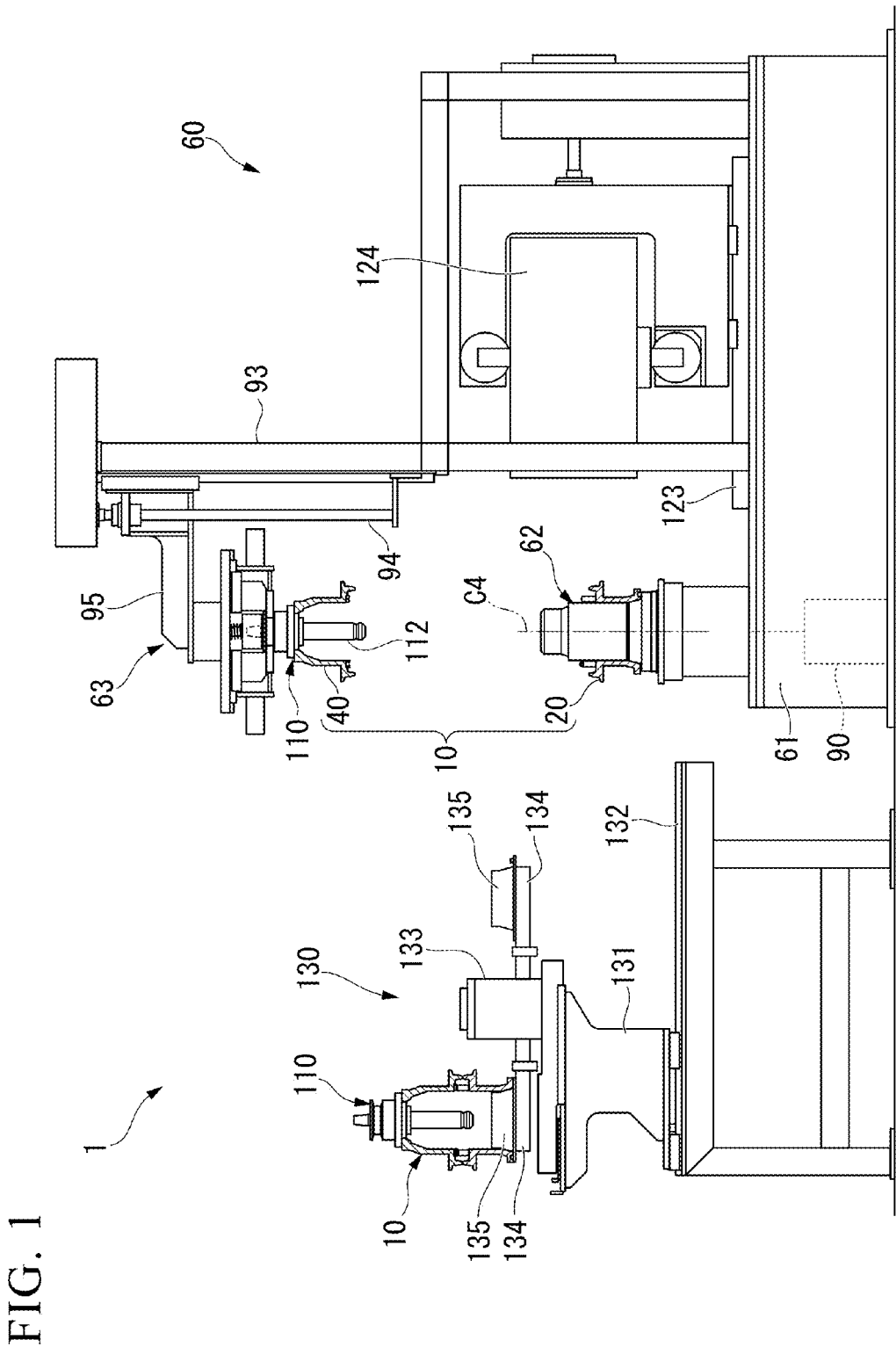
FIG. 1 is an explanatory view of a tire uniformity measuring apparatus of an embodiment of the present invention.

As shown in FIG. 1, a rim assembly 10 to which a tire that is a test object is attached is attachable to and detachable from the tire measuring apparatus 1 of the present embodiment. The tire measuring apparatus 1 includes a body unit 60 that rotates the mounted rim assembly 10 around its axis to perform measurement, a rim replacement unit 130 for replacing the rim assembly 10 mounted on the body unit 60, and a control unit (not shown) that controls the rim replacement unit 130 and the body unit 60.

The tire measuring apparatus 1 includes various types of rim assemblies 10 with different external diameters according to the types of tires to be measured. In the following, one type of rim assembly 10 among them will be described.

Figure 2:
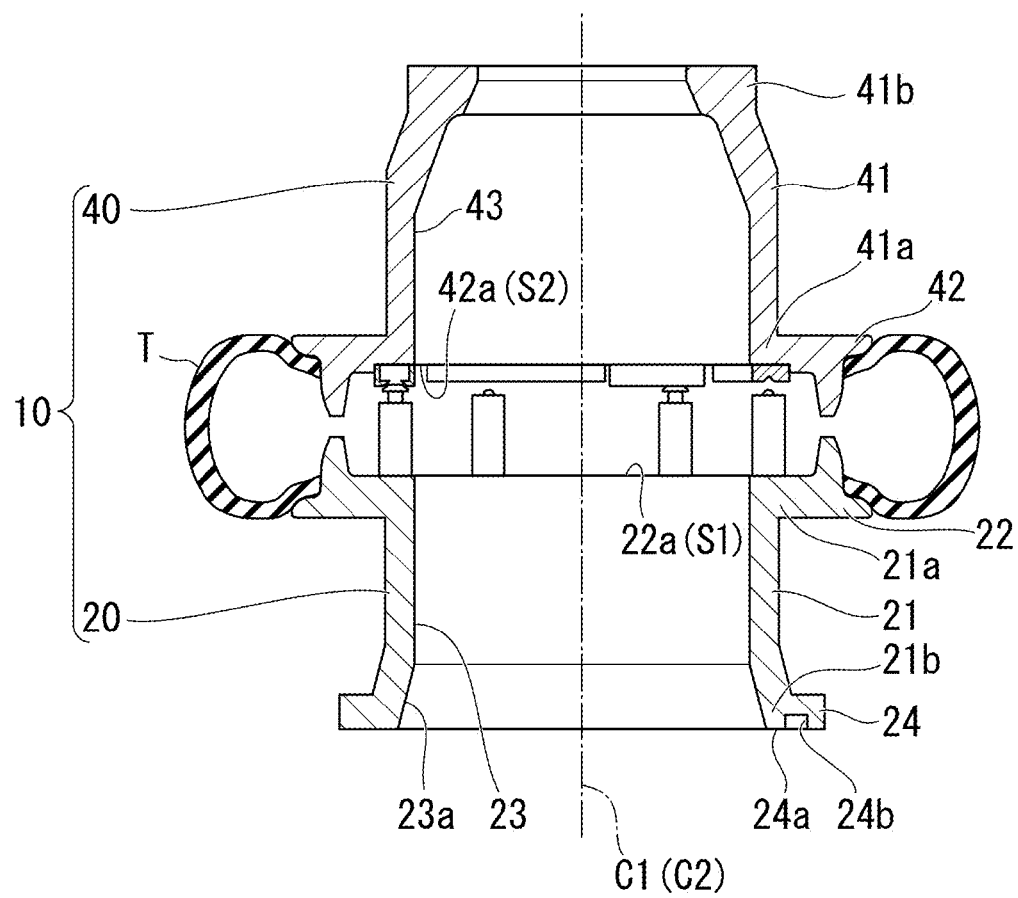
FIG. 2 is a cross-sectional view describing the state of a rim assembly attached to a lower spindle of the tire uniformity measuring apparatus.

FIG. 2 is a cross-sectional view describing the state of the rim assembly 10 attached to a lower spindle 62 of the body unit 60. The lower spindle 62 is not shown in FIG. 2 for convenience of description.

The rim assembly 10 has a lower rim (first rim) 20 and an upper rim (second rim) 40.

Both the rims 20 and 40 can be engaged with each other or disengaged from each other in a state where a first reference surface S1 set at the lower rim 20 and a second reference surface S2 set at the upper rim 40 are caused to face each other.

The lower rim 20 has a body 21 formed in a cylindrical shape, and a collar portion 22 provided at an outer peripheral surface of an upper end portion 21a of the body 21. The first reference surface S1 is formed on a principal surface 22a of the collar portion 22 opposite to a lower end portion 21b of the body 21. The first reference surface S1 is formed so as to be orthogonal to an axis (reference axis) C1 of the lower rim 20.

The body 21 is formed with a lower through hole 23 that extends so as to be orthogonal to the first reference surface S1.

An inner peripheral surface of the lower end portion 21b in the lower through hole 23 is formed with a rim-side inclined surface 23a whose diameter increases as being set apart from the end portion 21a. The rim-side inclined surface 23a is formed in the shape of a side surface of a truncated cone.

An outer peripheral surface of the lower end portion 21b of the body 21 is provided with a second collar portion 24. A principal surface 24a of the second collar portion 24 opposite to the collar portion 22 is formed with a positioning hole portion 24b.

Figure 3:
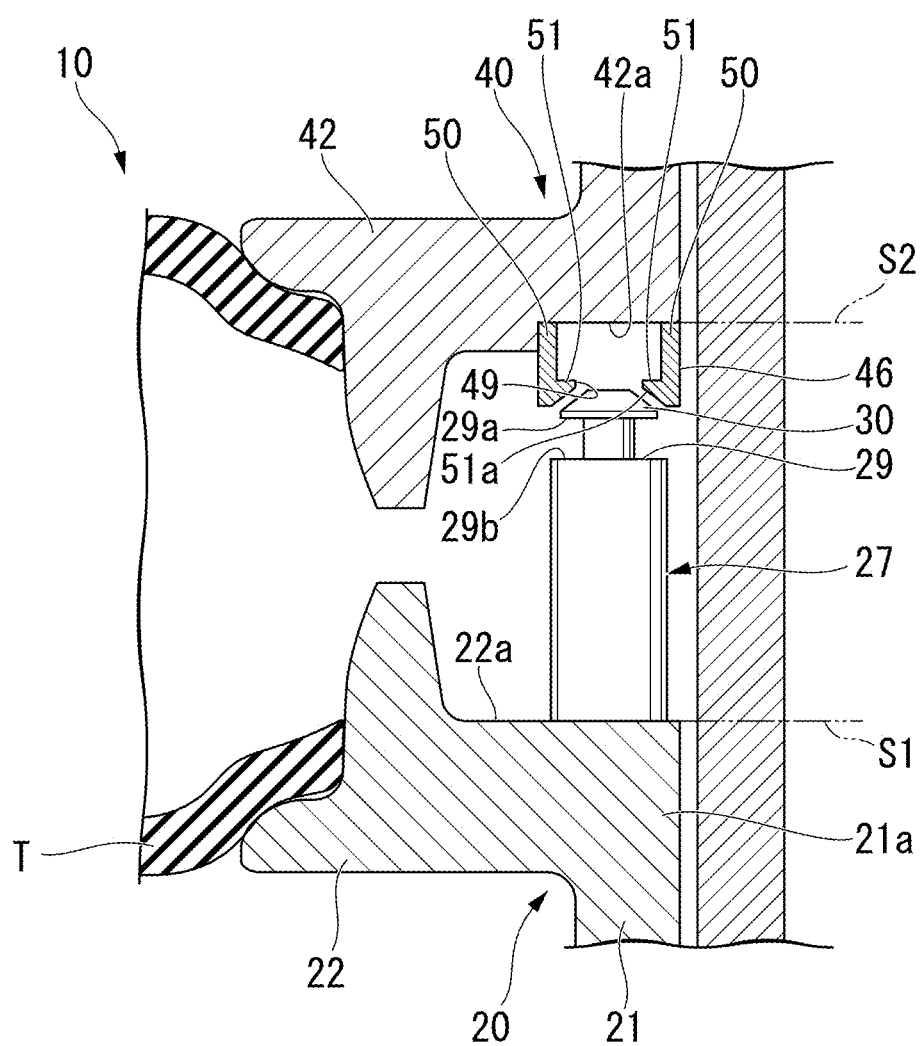
FIG. 3 is an enlarged view of main portions on a pin side of the rim assembly in FIG. 2.
Figure 4:
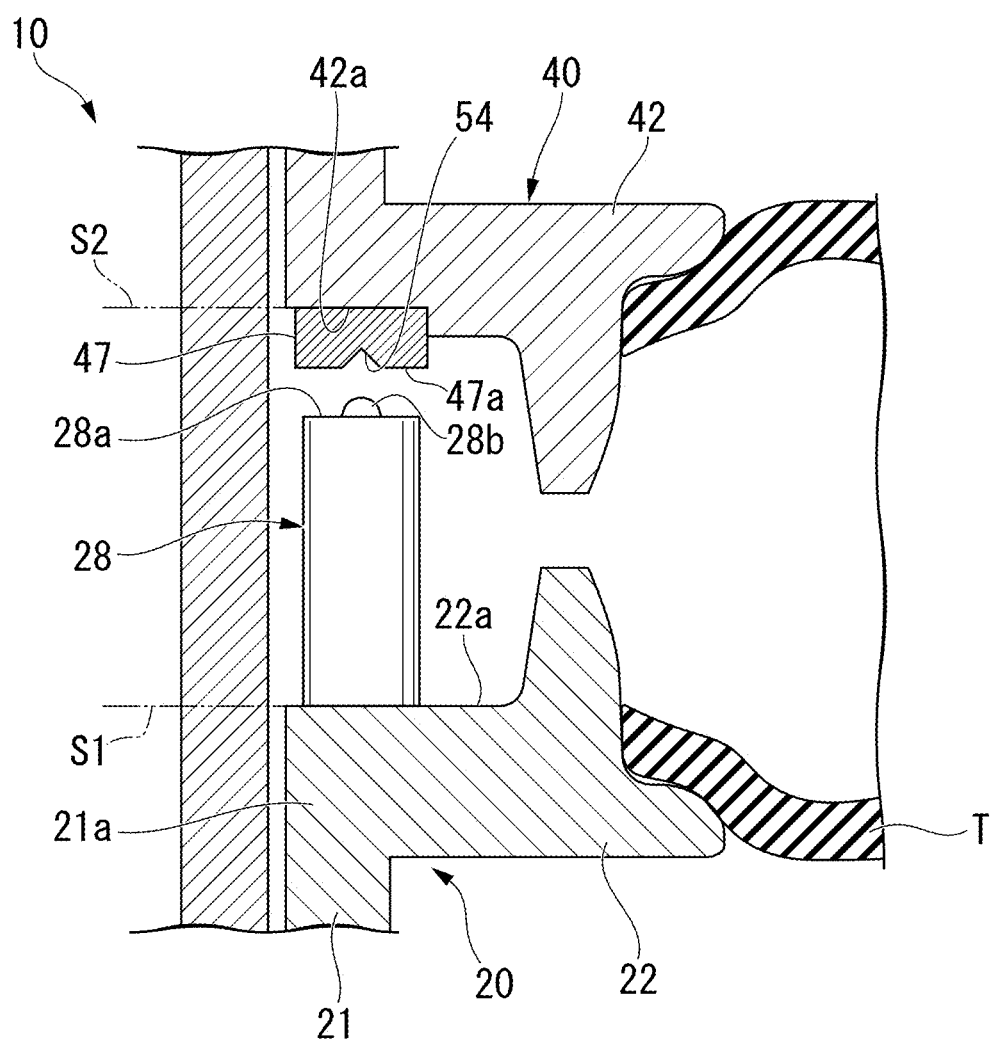
FIG. 4 is an enlarged view of main portions on a stand side of the rim assembly in FIG. 2.
Figure 5:
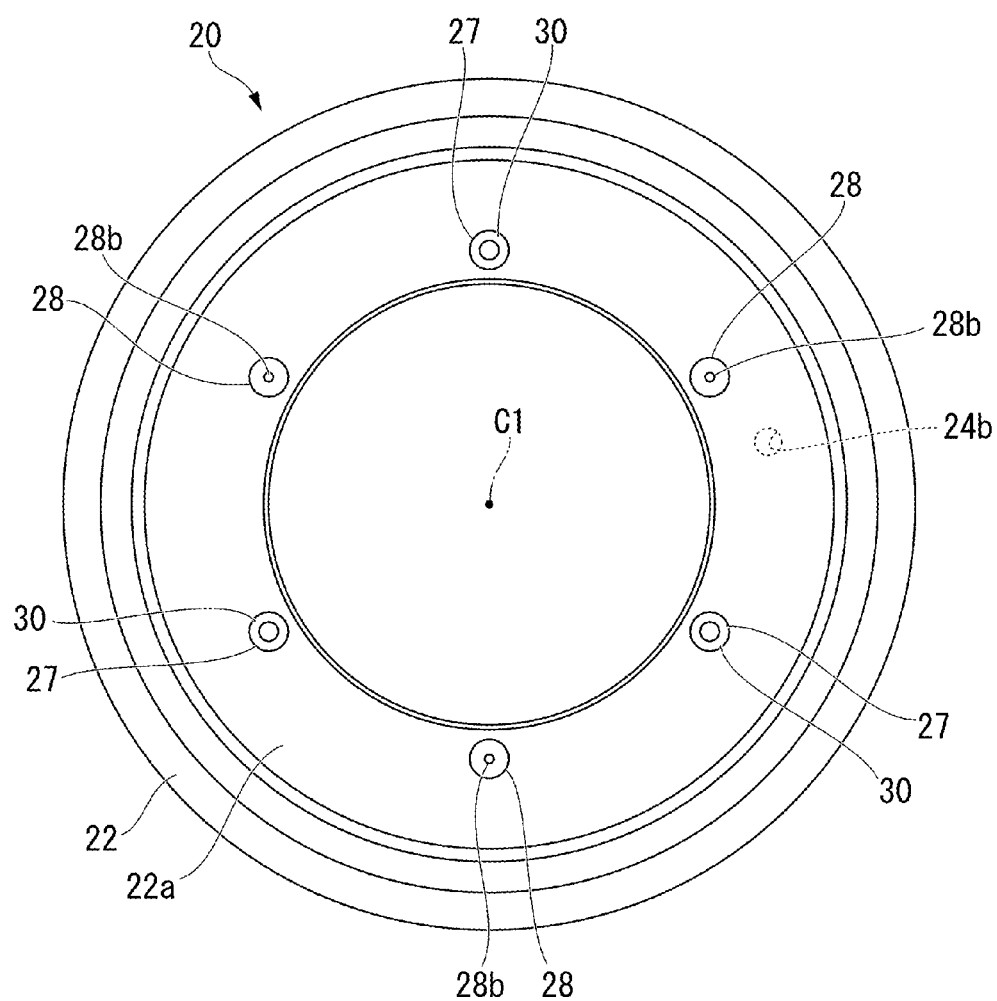
FIG. 5 is a plan view of a lower rim of the tire uniformity measuring apparatus.

As shown in FIGS. 3 to 5, pins 27 and stands 28 are erected from the principal surface 22a of the collar portion 22. Three pins 27 and three stands 28 are alternately arranged at equal angles around the axis C1 of the lower rim 20.

As shown in FIGS. 3 and 5, each pin 27 is formed in a substantially collar shape. A groove portion 29 is formed over the entire circumference of an outer peripheral surface of the pin 27 on the tip side (upper side) in an erection direction. A side surface 29a on the tip side of the groove portion 29 and a side surface 29b on a base end side are formed so as to be parallel to the principal surface 22a, respectively. The portion of the pin 27 closer to the tip side than the groove portion 29 is formed as a tapered projection portion 30 whose diameter decreases as being brought close to the tip.

As shown in FIGS. 4 and 5, each stand 28 is formed in a columnar shape. A tip face 28a of the stand 28 is provided with a substantially semispherical convex portion 28b that protrudes from the tip face 28a.

A tire T that is a test object is attached to a portion closer to an edge portion than a portion where the pins 27 and the stands 28 are provided, in the principal surface 22a of the collar portion 22.

As shown in FIG. 2, the upper rim 40 has a body 41 formed in a substantially cylindrical shape, and a collar portion 42 provided at an outer peripheral surface of a lower end portion 41a of the body 41. The second reference surface S2 is formed on a principal surface 42a of the collar portion 42 opposite to an upper end portion 41b of the body 41.

The body 41 is formed with an upper through hole 43 that extends so as to be orthogonal to the second reference surface S2.

Figure 6:
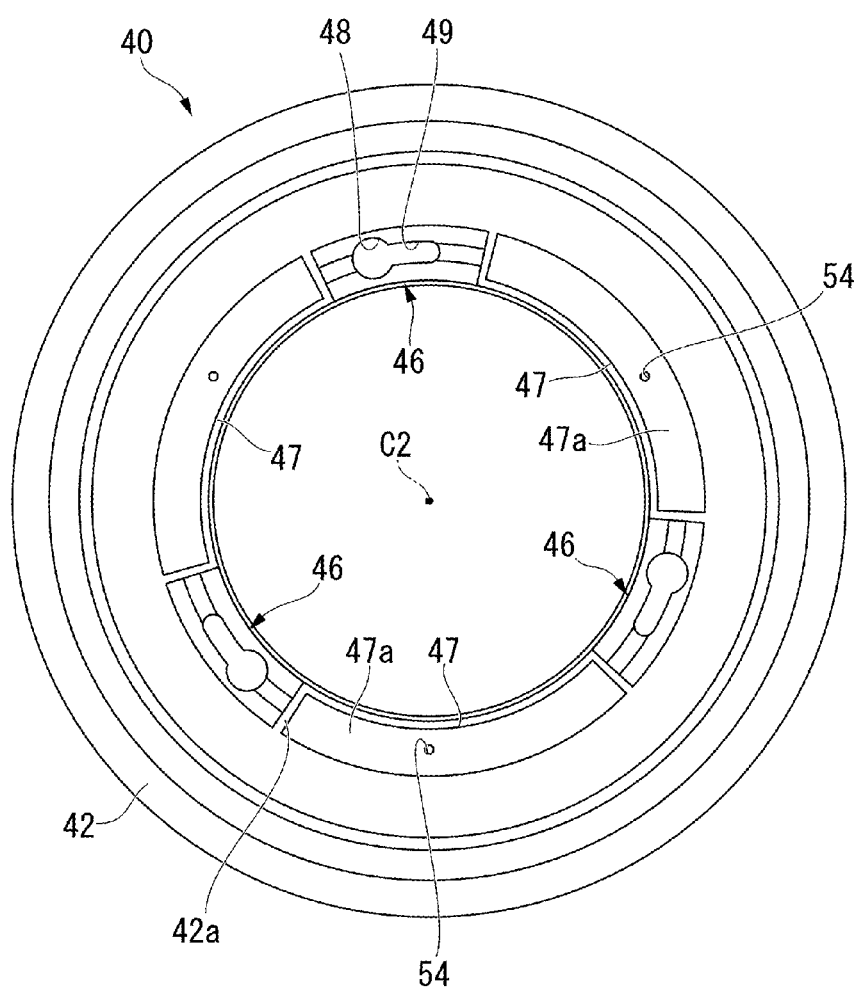
FIG. 6 is a bottom plan view of an upper rim of the tire uniformity measuring apparatus.

As shown in FIGS. 3, 4, and 6, the principal surface 42a of the collar portion 42 is provided with pin receiving portions 46 and stand receiving portions 47. Three pin receiving portions 46 and three stand receiving portions 47 are alternately arranged at equal angles around an axis C2 of the upper rim 40.

Figure 7:
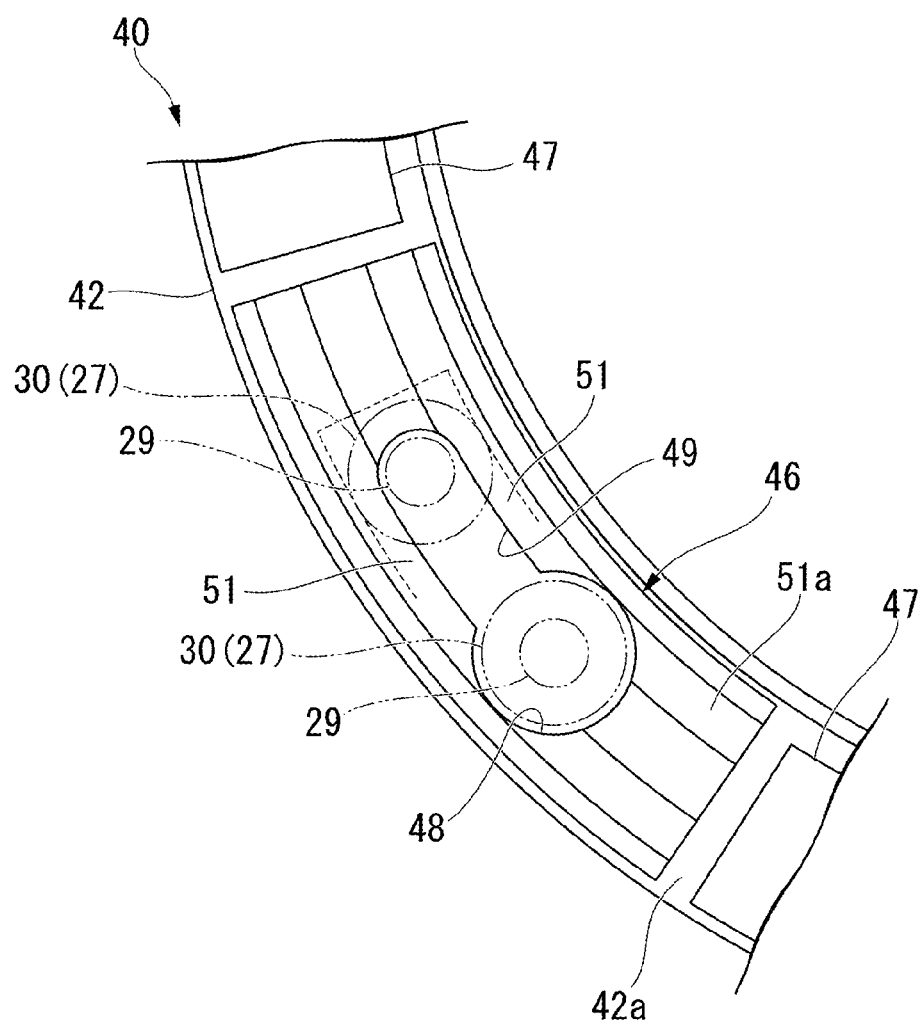
FIG. 7 is a bottom plan view for describing the engagement state between pins and pin receiving portions of the tire uniformity measuring apparatus.

As shown in FIGS. 3 and 7, each pin receiving portion 46 is formed with an opening portion 48 for insertion and a sliding opening portion 49. The opening portion 48 for insertion and the sliding opening portion 49 communicate with each other. The projection portion 30 of the pin 27 can enter and leave the opening portion 48 for insertion. The sliding opening portion 49 is formed in a portion of the opening portion 48 for insertion, and opens along the circumferential direction of the upper rim 40. The width of the sliding opening portion 49 is smaller than the external diameter of the projection portion 30 of the pin 27 and greater than the external diameter of the groove portion 29.

Figure 8:
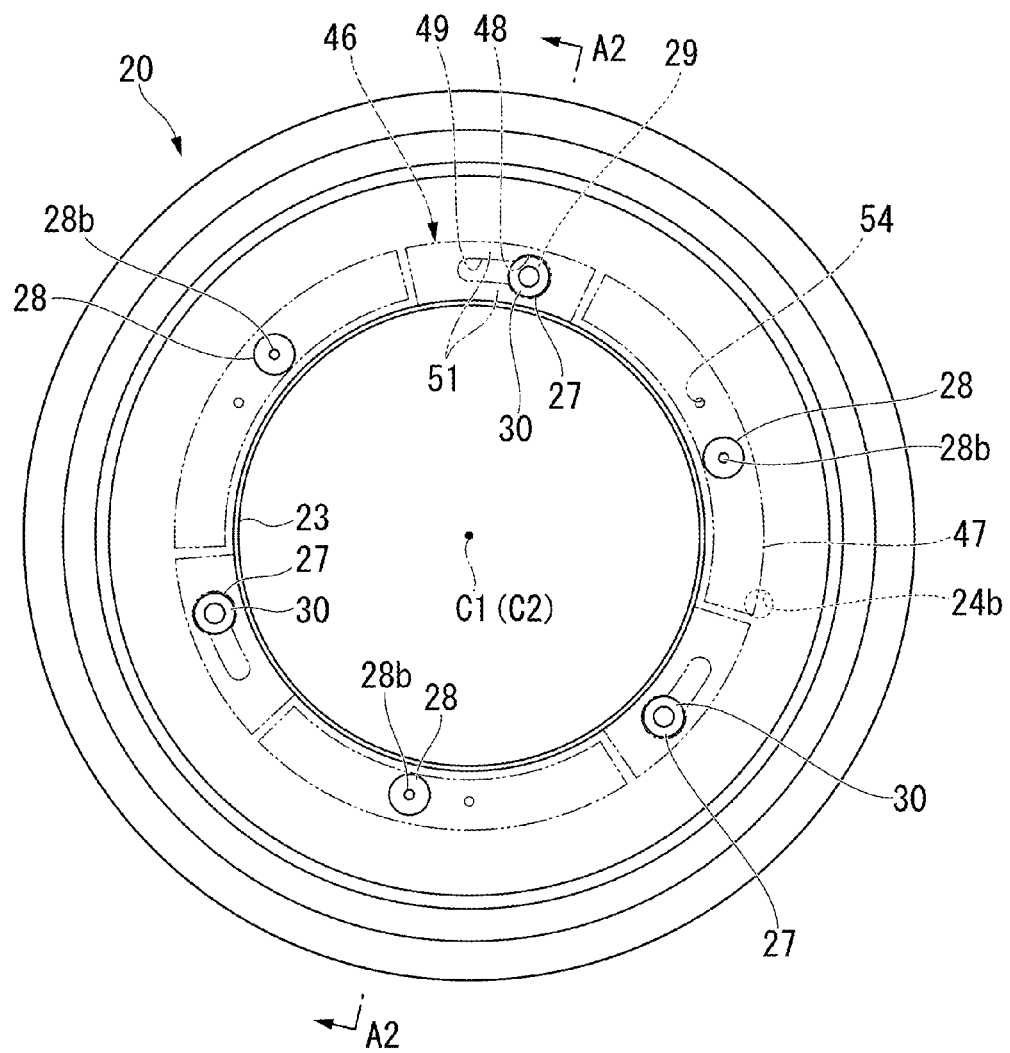
FIG. 8 is a plan view for describing a state where the pins of the lower rim are arranged within insertion opening portions of the pin receiving portions.

In a plan view shown in FIG. 8, the sliding opening portion 49 is arranged in the counterclockwise direction with respect to the opening portion 48 for insertion.

As shown in FIGS. 3 and 7, the pin receiving portion 46 has a pair of wall portions 50 that are erected from the principal surface 42a so as to face each other, and a pair of protruding portions 51 that are provided so as to extend from tip portions of the wall portions 50 toward the tip portions of the wall portions 50 that face each other. The aforementioned sliding opening portion 49 is formed by a gap between the pair of protruding portions 51 that extend so as to be brought close to each other.

The wall portions 50 extend along the circumferential direction of the upper rim 40. The spacing between the wall portions 50 is wider than the external diameter of the projection portion 30 of the pin 27. The distance from the principal surface 42a to the protruding portions 51 is longer than the length of the projection portion 30.

The thickness of the protruding portions 51 is set so as to become shorter than the distance between the side surfaces 29a and 29b of the groove portion 29. The protruding portions 51 are formed so as to be capable of being set apart from any of the side surfaces 29a and 29b when the protruding portions 51 are arranged in the groove portion 29.

The surfaces of the protruding portions 51 opposite to the principal surface 42a are formed with a concave groove 51a that can accommodate the projection portion 30 of the pin 27 and is formed in a concave shape.

As shown in FIG. 6, in a bottom view, each stand receiving portion 47 is formed in a circular-arc shape along the circumferential direction of the upper rim 40. In other words, the stand receiving portion 47 is formed so as to extend around the axis C2.

As shown in FIG. 4, a tip face 47a of the stand receiving portion 47 is formed so as to become parallel to the principal surface 42a.

As shown in FIGS. 4 and 6, each tip face 47a is formed with a concave portion 54. When the tip face 28a of the stand 28 contacts with the tip face 47a of the stand receiving portion 47, the concave portion 54 is allowed to engage the convex portion 28b of the stand 28.

Figure 9:
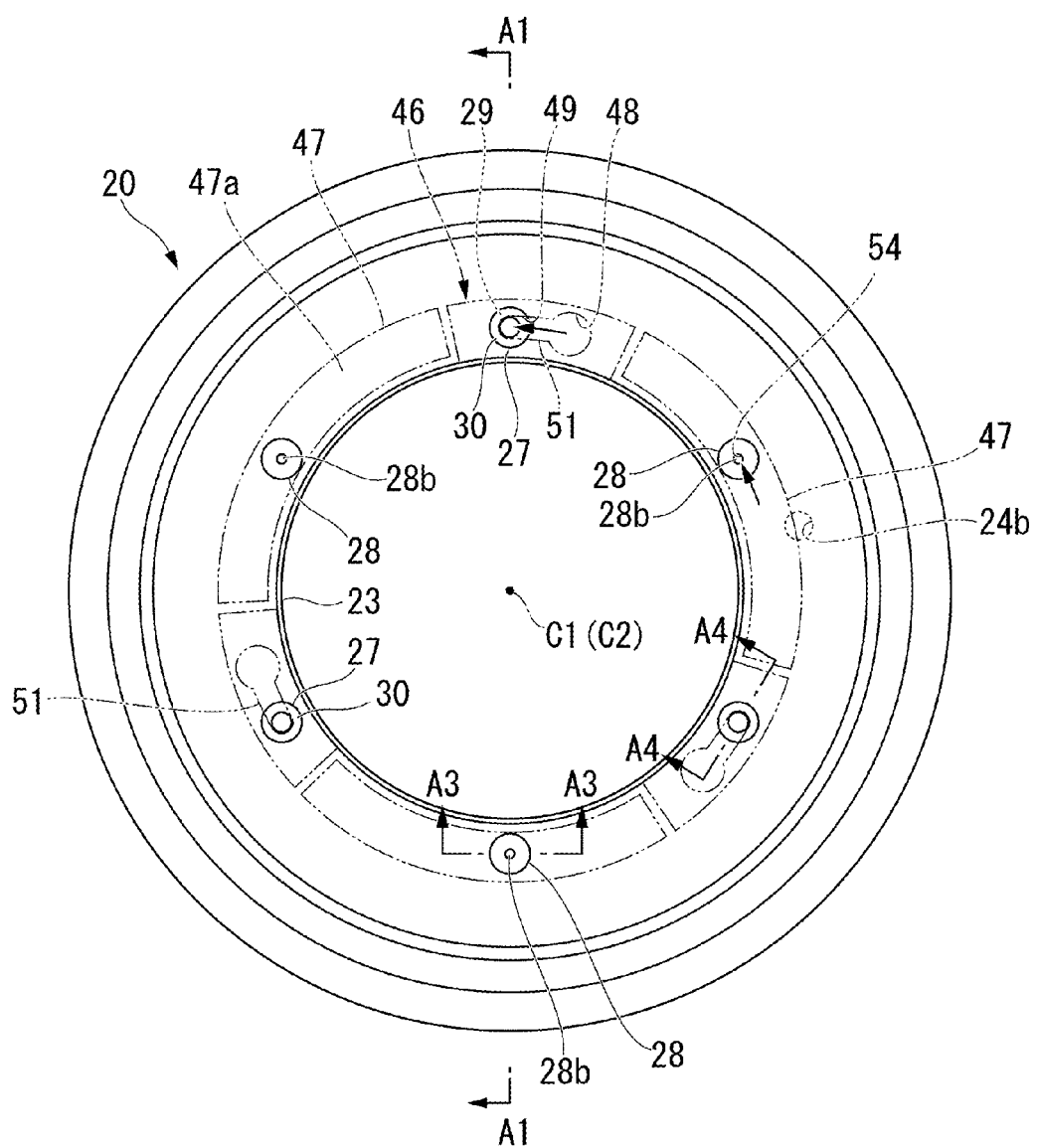
FIG. 9 is a plan view for describing a state where protruding portions are arranged in groove portions of the pins of the lower rim.
Figure 10:
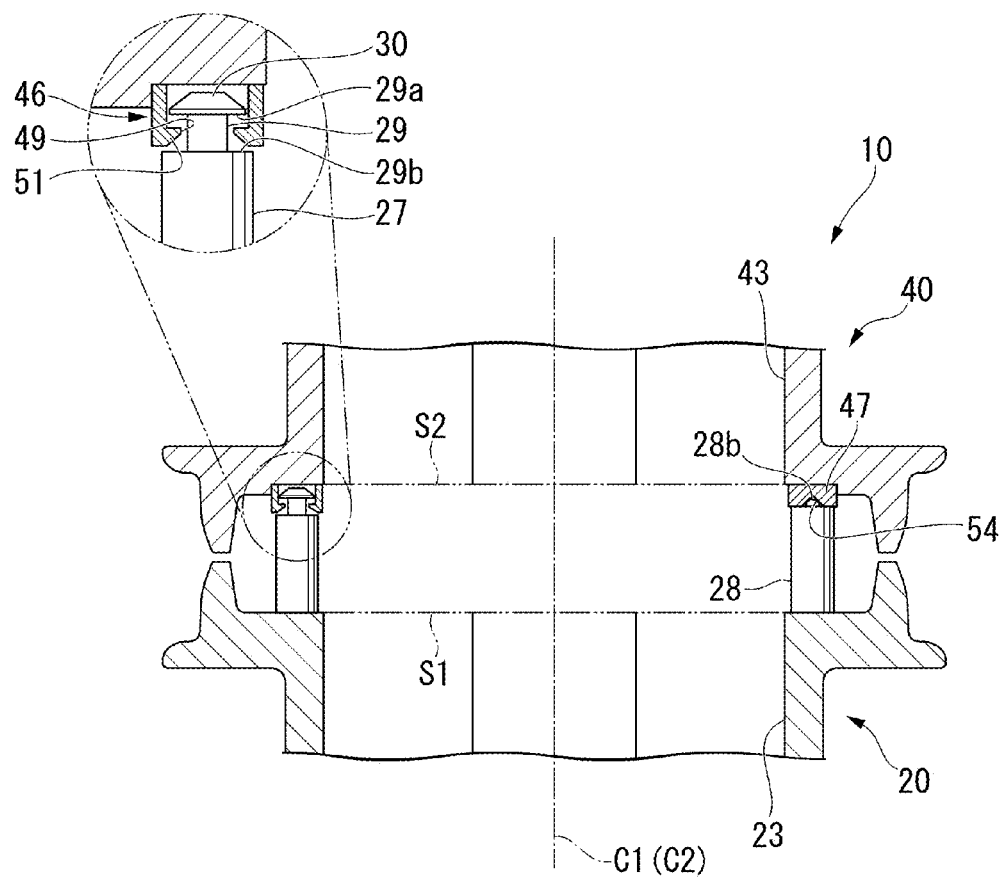
FIG. 10 is a cross-sectional view taken along a line A1-A1 in FIG. 9.

The concave portion 54 is formed in a shape that is recessed in a conical shape from the tip face 47a (refer to FIG. 4). As shown in FIGS. 9 and 10, the concave portion 54 is provided at a position that faces the convex portion 28b of the stand 28 when the protruding portions 51 are arranged within the groove portion 29.

As shown in FIG. 8, if the lower rim 20 and the upper rim 40 overlap each other so that the axes C1 and C2 coincide with each other, the convex portion 28b of the stand 28 and the concave portion 54 of the stand receiving portion 47 are arranged on the circumferences of reference circles centered on the axes C1 and C2, respectively.

As shown in FIGS. 3 and 4, the tire T that is a test object is attached to a portion closer to an edge portion than a portion where the pin receiving portions 46 and the stand receiving portions 47 are provided, in the principal surface 42a of the collar portion 42.

The engagement state of the rim assembly 10 will be described.

For example, when the rim assembly 10 is detached from the body unit 60 and arranged on the rim replacement unit 130 or stored, the lower rim 20 is arranged on a floor or the like, and the upper rim 40 engaged with the lower rim 20 is arranged on the lower rim 20.

As will be described below, in order to engage the lower rim 20 and the upper rim 40 with each other, the aforementioned pins 27 and pin receiving portions 46 are engaged with each other. At this time, the stands 28 and the stand receiving portions 47 contact each other or are set apart from each other depending on the engagement state between the pins 27 and the pin receiving portions 46.

A procedure for engaging the lower rim 20 and the upper rim 40 with each other from a state where the lower rim 20 and the upper rim 40 are set apart from each other will be described.

Figure 11:
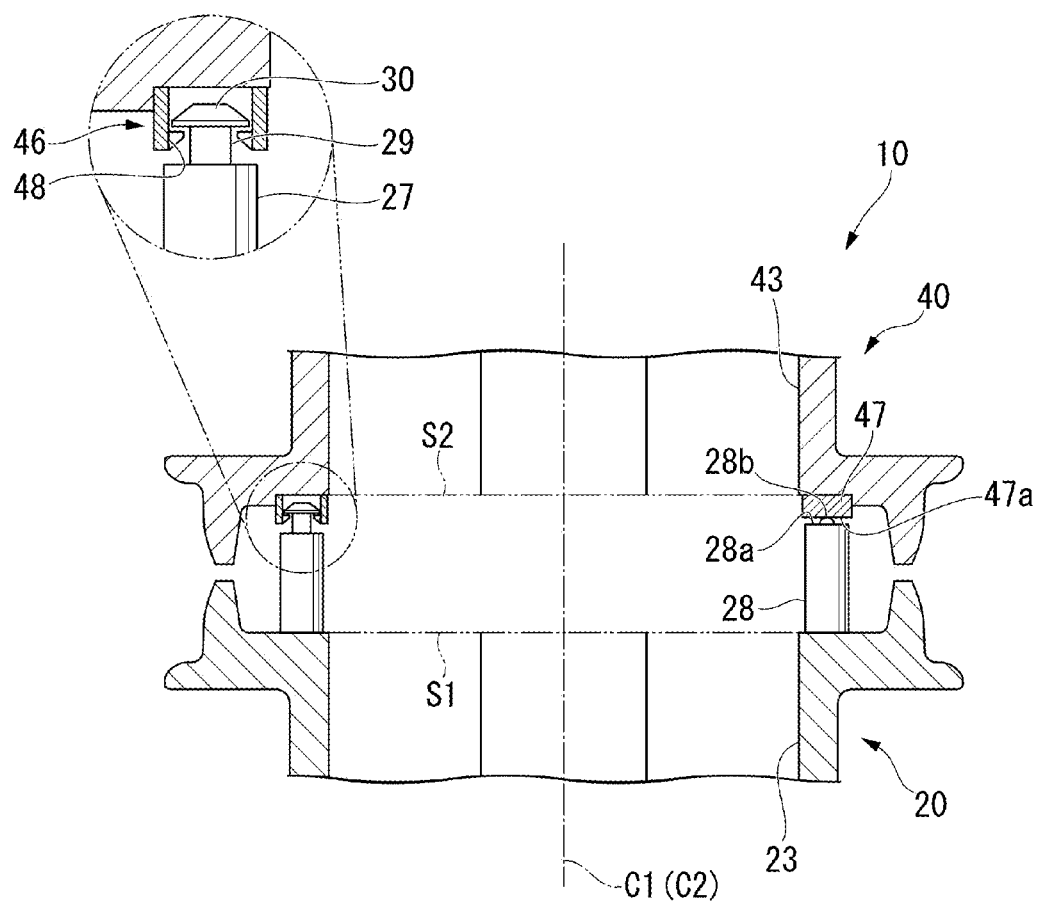
FIG. 11 is a cross-sectional view taken along a line A2-A2 in FIG. 8.

As shown in FIGS. 8 and 11, the upper rim 40 is arranged above the lower rim 20 so that the respective reference surfaces 51 and S2 face each other. The projection portions 30 of the pins 27 are inserted into the opening portions 48 for insertion. At this time, the stand receiving portions 47 are caused not to contact the stand 28 but are slightly set apart from the stands 28.

By rotating the lower rim 20 around an axis C1 with respect to the upper rim 40 while maintaining the distance between the reference surfaces S1 and S2 from this state, as shown in FIGS. 9 and 10, the protruding portions 51 of the pin receiving portions 46 are arranged in the groove portions 29 of the pins 27.

In a plan view, if the distance between the reference surface S1 and S2 is reduced and the stand receiving portions 47 are caused to contact with the stand 28 when the positions (phases) of the concave portions 54 and convex portions 28b coincide with each other, the convex portions 28b engage the concave portions 54. At this time, the protruding portions 51 are set apart from the side surfaces 29a and 29b of the groove portions 29.

Figure 12:
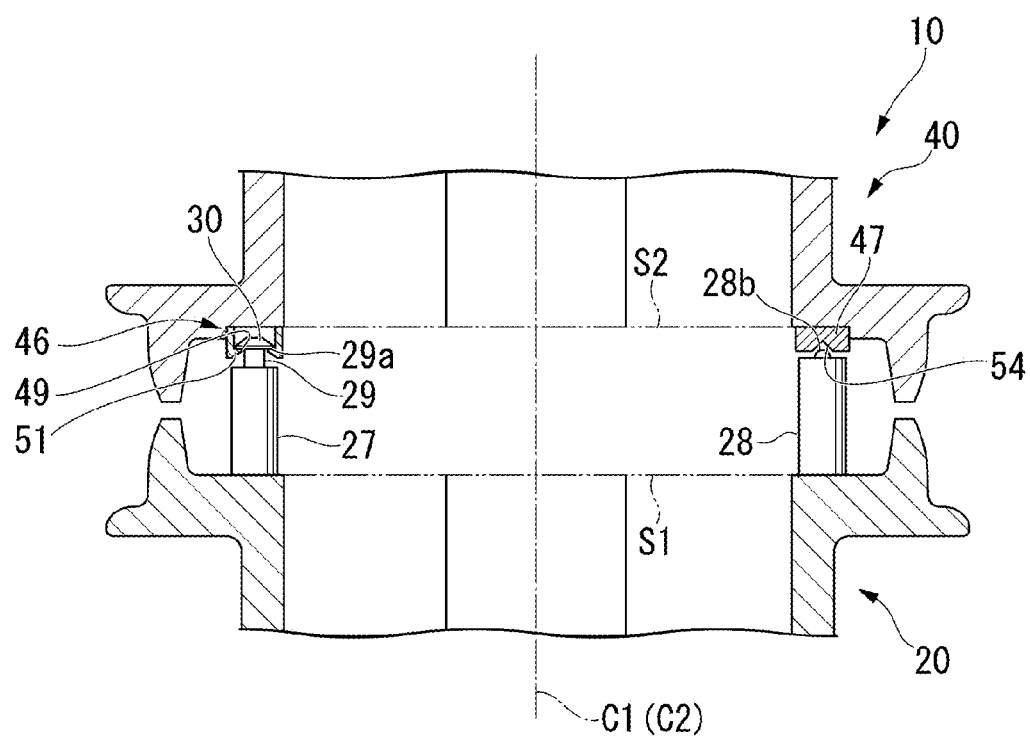
FIG. 12 is a cross-sectional view for describing a state where the upper rim in which the protruding portions are arranged in the groove portions of the pins of the lower rim is lifted.

As shown in FIG. 12, if the upper rim 40 is lifted upward from a state where the convex portions 28b engage the concave portions 54, the lower rim 20 moves so as to be set apart from the upper rim 40 due to the gravity that acts on the lower rim 20. The first reference surface S1 moves so as to be set apart from the second reference surface S2. At this time, the side surfaces 29a of the groove portions 29 engage the protruding portions 51, the pin receiving portions 46 support the pins 27, and the lower rim 20 is hung from the upper rim 40. The stands 28 are set apart from the stand receiving portions 47, and the engagement between the convex portions 28b and the concave portions 54 is released.

When the rim assembly 10 is detached from the body unit 60, both the rims 20 and 40 engage each other by the protruding portions 51 being arranged within the groove portions 29.

On the other hand, when the rim assembly 10 is attached to the body unit 60, the engagement between both the rims 20 and 40 is released. As will be described below, both the rims 20 and 40 are adapted to be capable of being fixed by a fixing mechanism 76.

As shown in FIG. 1, the body unit 60 has a lower spindle (first attaching part) 62 that is rotatably supported on a base 61, and an elevating mechanism 63 attached to the base 61.

Figure 13:
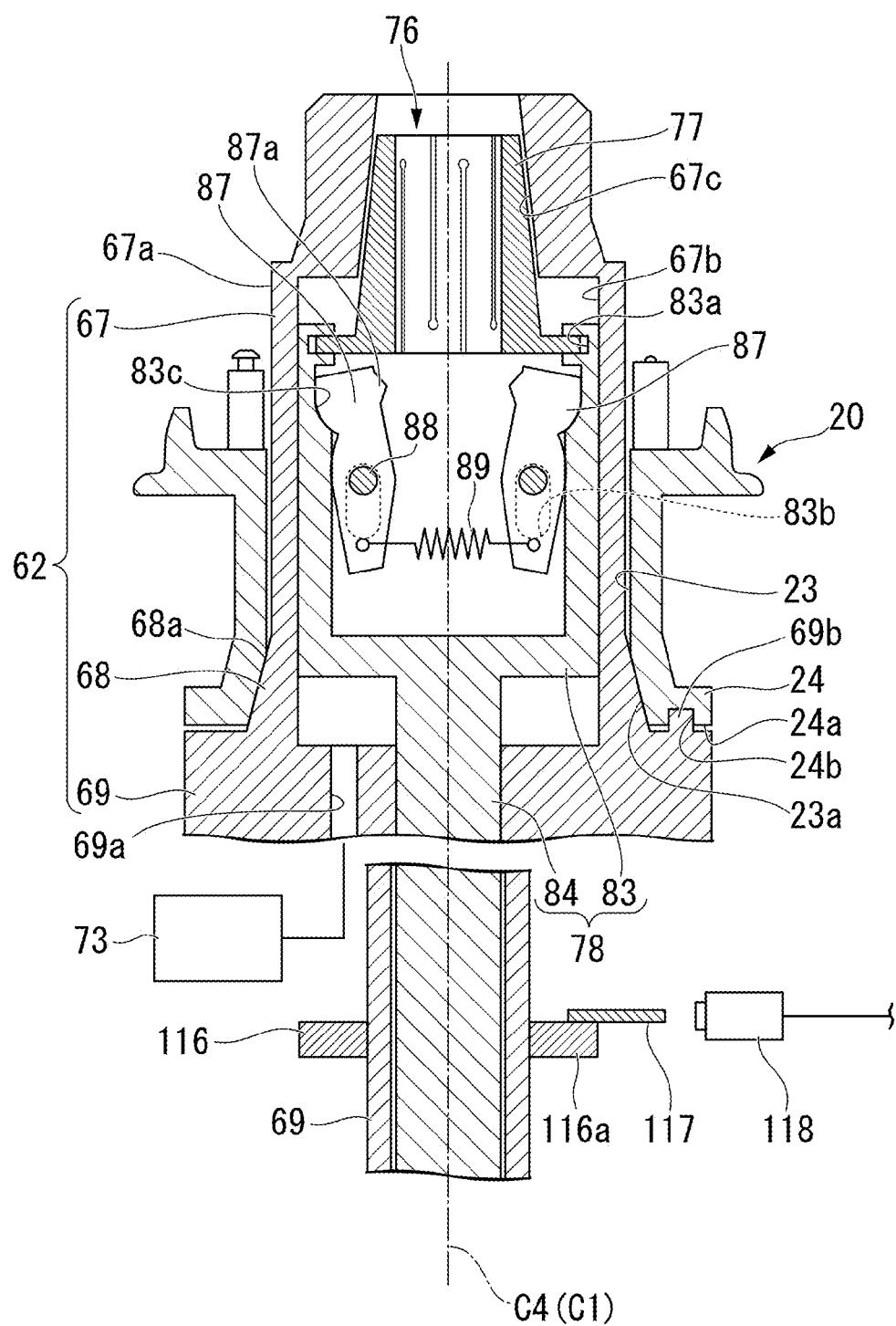
FIG. 13 is a cross-sectional view when a fixing mechanism of the tire uniformity measuring apparatus is brought into a standby state.

As shown in FIG. 13, the lower spindle 62 has a tube portion 67 formed in a substantially cylindrical shape, a taper portion 68 provided at a lower end portion of the tube portion 67, and an enlarged-diameter portion 69 provided at a lower end portion of the taper portion 68. The taper portion 68 is formed with an apparatus-side inclined surface 68a that is enlarged in diameter from an outer peripheral surface 67a of the tube portion 67 as being set apart from the tube portion 67. The enlarged-diameter portion 69 is set to have a greater external diameter than the taper portion 68.

The external diameter of the tube portion 67 is set so that the cylinder portion can pass through the lower through hole 23 of the lower rim 20, and the upper through hole 43 of the upper rim 40.

A conduit line of the tube portion 67 has a large diameter portion 67b with a constant internal diameter on a lower side thereof and has a small diameter portion 67c with a smaller internal diameter than the large diameter portion 67b on an upper side thereof. The small diameter portion 67c is formed so that the internal diameter thereof becomes smaller towards the top.

A hole portion for a tire (not shown) for supplying air to between the lower rim 20 and the upper rim 40 when the rim assembly 10 is attached to the lower spindle 62 is formed in the large diameter portion 67b so as to pass therethrough.

The apparatus-side inclined surface 68a is formed in the shape of an outside surface of a truncated cone that has an axis C4 of the lower spindle 62 as its central axis. The angle formed between the axis C4 and the apparatus-side inclined surface 68a is set to be equal to the angle formed between the axis C1 of the lower rim 20 and the rim-side inclined surface 23a.

The enlarged-diameter portion 69 is formed with a vent hole 69a that communicates with the large diameter portion 67b. The vent hole 69a is connected to an air supply source 73, and can supply compressed air into the large diameter portion 67b through the vent hole 69a. The air supplied into the large diameter portion 67b is discharged to the outside through the hole portion for a tire.

An upper surface of the enlarged-diameter portion 69 is formed with a positioning convex portion 69b that engages the aforementioned positioning hole portion 24b.

A state where the lower rim 20 is attached to the lower spindle 62 will be described.

As shown in FIG. 13, the lower rim 20 is lowered while the lower spindle 62 is inserted into the lower through hole 23 of the lower rim 20 and the direction of the lower rim 20 around the axis C1 is adjusted.

If the positioning hole portion 24b is engaged with the positioning convex portion 69b and the rim-side inclined surface 23a of the lower rim 20 is caused to contact with the apparatus-side inclined surface 68a of the lower spindle 62, the rim-side inclined surface 23a comes into surface contact with the apparatus-side inclined surface 68a.

By engaging the positioning hole portion 24b with the positioning convex portion 69b, the position (phase) of the lower rim 20 around the axis C1 with respect to the lower spindle 62 becomes constant.

In this way, the lower rim 20 is attachable to and detachable from the lower spindle 62.

The fixing mechanism (fixing part) 76 is built in the lower spindle 62. The fixing mechanism 76 is, for example, a well-known fixing mechanism described in Japanese Patent No. 3040514. The fixing mechanism 76 includes a taper sleeve 77 and a hook operating rod 78 connected to the taper sleeve 77. The taper sleeve 77 and the hook operating rod 78 are main constituent elements of the fixing mechanism 76.

Figure 14:
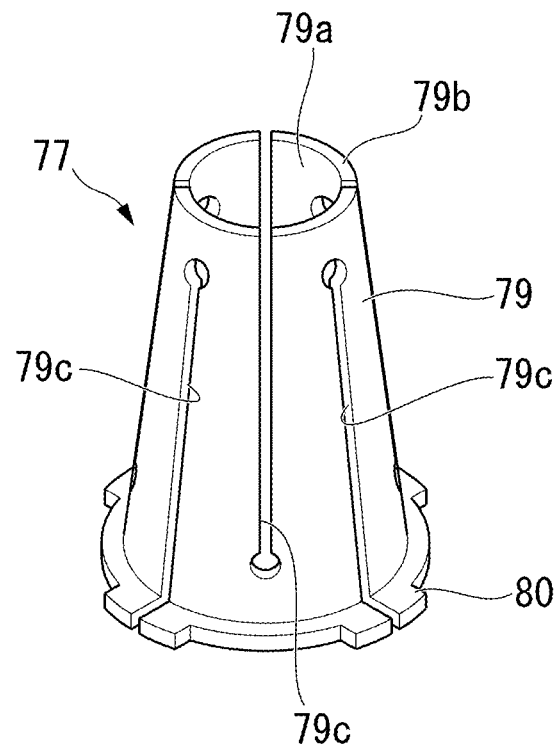
FIG. 14 is a perspective view of a taper sleeve built in the lower spindle.

As shown in FIG. 14, the taper sleeve 77 has a body 79 formed in the shape of a substantially truncated cone, and a flange portion 80 provided at an outer peripheral surface of a lower end of the body 79.

A through hole 79a is formed in the direction of the axis C4 in the body 79. A side wall 79b of the body 79 is formed with a plurality of slits 79c that pass through the side wall 79b in the thickness direction and extend along the axis C4 of the body 79. As the taper sleeve 77 receives a compressive force in the radial direction, the width of the slits 79c becomes small and the internal diameter of the through hole 79a can be made small.

As shown in FIG. 13, the hook operating rod 78 has a cylindrical portion 83 formed in a bottomed tubular shape, and a shaft-like member 84 fixed to a bottom surface of the cylindrical portion 83 and extends downward. An upper end of an inner peripheral surface of the cylindrical portion 83 is formed with an annular groove 83a that engages the flange portion 80 of the taper sleeve 77. The cylindrical portion 83 is formed with a pair of long holes 83b that pass through a wall portion of the cylindrical portion and have a long axis in an up-and-down direction.

Figure 15:
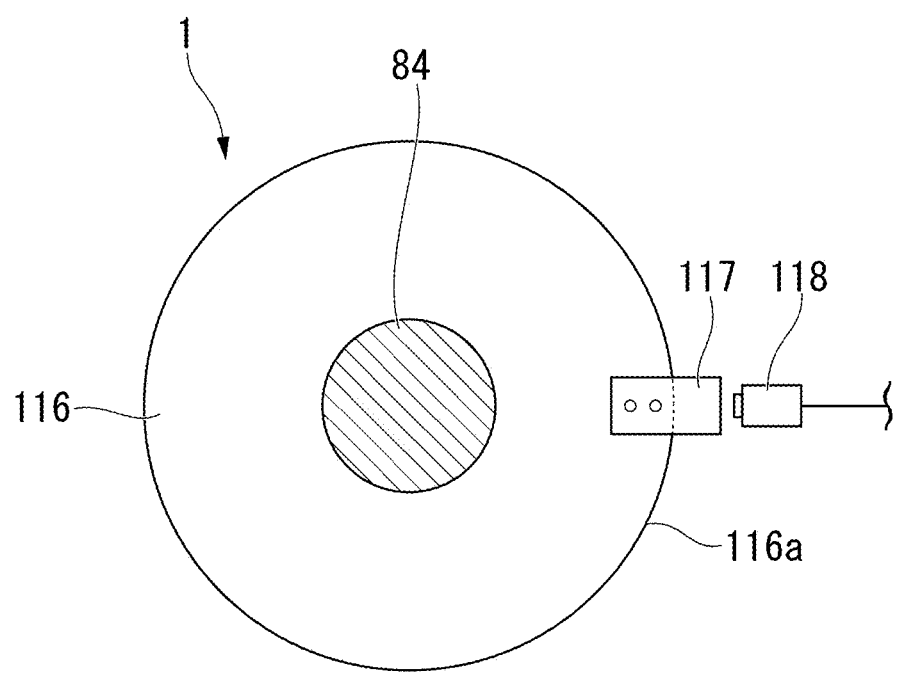
FIG. 15 is a cross-sectional view of main portions of the fixing mechanism.

As shown in FIGS. 13 and 15, a disk-shaped member 116, a cylinder (not shown), and the like are attached to a lower end side of the enlarged-diameter portion 69.

As shown in FIG. 15, a metal detector 117 is fixed to an edge portion 116a of the disk-shaped member 116 so as to protrude radially outward from the disk-shaped member 116. A well-known lower proximity sensor (first detecting part) 118 is provided on an outer peripheral side of the disk-shaped member 116 so as to face the edge portion 116a.

A magnet or a detection circuit (not shown) is built in the lower proximity sensor 118, so that whether the metal detector 117 is brought closer to the lower proximity sensor than a certain distance or not can be detected without contact. The lower proximity sensor 118 can detect the position of the lower spindle 62 around the axis C1 by detecting whether or not the metal detector 117 is brought close to the lower proximity sensor. The lower proximity sensor 118 is fixed to, for example, the base 61. The lower proximity sensor 118 transmits a signal to a control unit when the sensor has detected the metal detector 117.

The aforementioned cylinder can move the hook operating rod 78 up and down.

As shown in FIG. 13, a pair of hooks 87 is arranged within the cylindrical portion 83 so as to face each other across the axis C4. Both ends of a pin 88 that servers as a supporting point of each hook 87 are fixed to the lower spindle 62 through each long hole 83b of the cylindrical portion 83. A spring 89 is connected to lower end portions of the hooks 87 so as to bias the lower end portions of the hooks 87 in a mutually approaching manner.

An engaging claw 87a is provided so as to protrude from a region of an upper end portion of each hook 87 that faces the axis C4.

In a standby state shown in FIG. 13, the hook operating rod 78 of the fixing mechanism 76 moves downward with respect to the lower spindle 62. A slight gap is formed between the outer peripheral surface of the taper sleeve 77 and the small diameter portion 67c of the tube portion 67 in a natural state. Moreover, the upper end portions of the hooks 87 enter a concaved portion 83c formed in an inner peripheral surface of the cylindrical portion 83 by being biased by the spring 89, and the distance between the engaging claws 87a is made larger than the external diameter of an upper rim shaft 112, to be described below.

Figure 16:
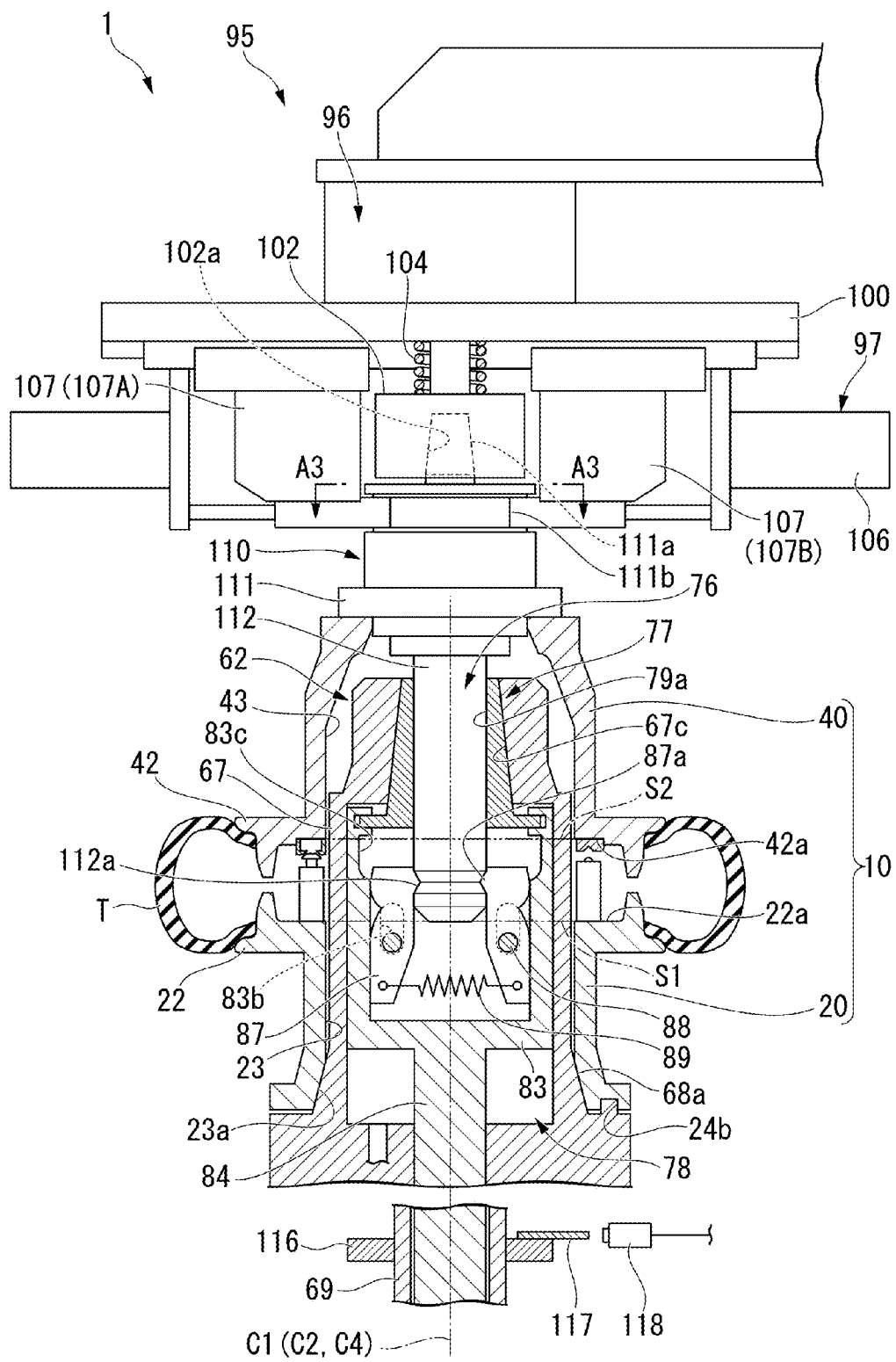
FIG. 16 is a cross-sectional view when the fixing mechanism is brought into a fixing state.

On the other hand, in a fixed state shown in FIG. 16, the hook operating rod 78 of the fixing mechanism 76 moves upward. As the taper sleeve 77 moves upward and is pushed into the small diameter portion 67c, the taper sleeve is compressed in the radial direction and the internal diameter of the through hole 79a becomes small. As the hook operating rod 78 moves upward with respect to the hooks 87, the upper end portions of the hooks 87 are pushed out of the concaved portion 83c, and the distance between the engaging claws 87a becomes short. At this time, since the pins 88 move within the long holes 83b, the pins 88 do not constrain the movement of the hook operating rod 78.

The lower spindle 62 is supported on the base 61 by a bearing (not shown). The lower spindle 62 can be rotated around the axis C4 by a servo motor (rotating part) 90 shown in FIG. 1.

The elevating mechanism 63 has a frame 93 fixed to the base 61, and a rim lifting and lowering device (attaching portion moving part) 95 attached to the frame 93 via a ball screw 94.

The rim lifting and lowering device 95 can be moved in the up-and-down direction by the ball screw 94, and the distance in the up-and-down direction between the lower spindle 62 and a connecting adapter 110 (to be described below) attached to the rim lifting and lowering device 95 can be adjusted.

Figure 17:
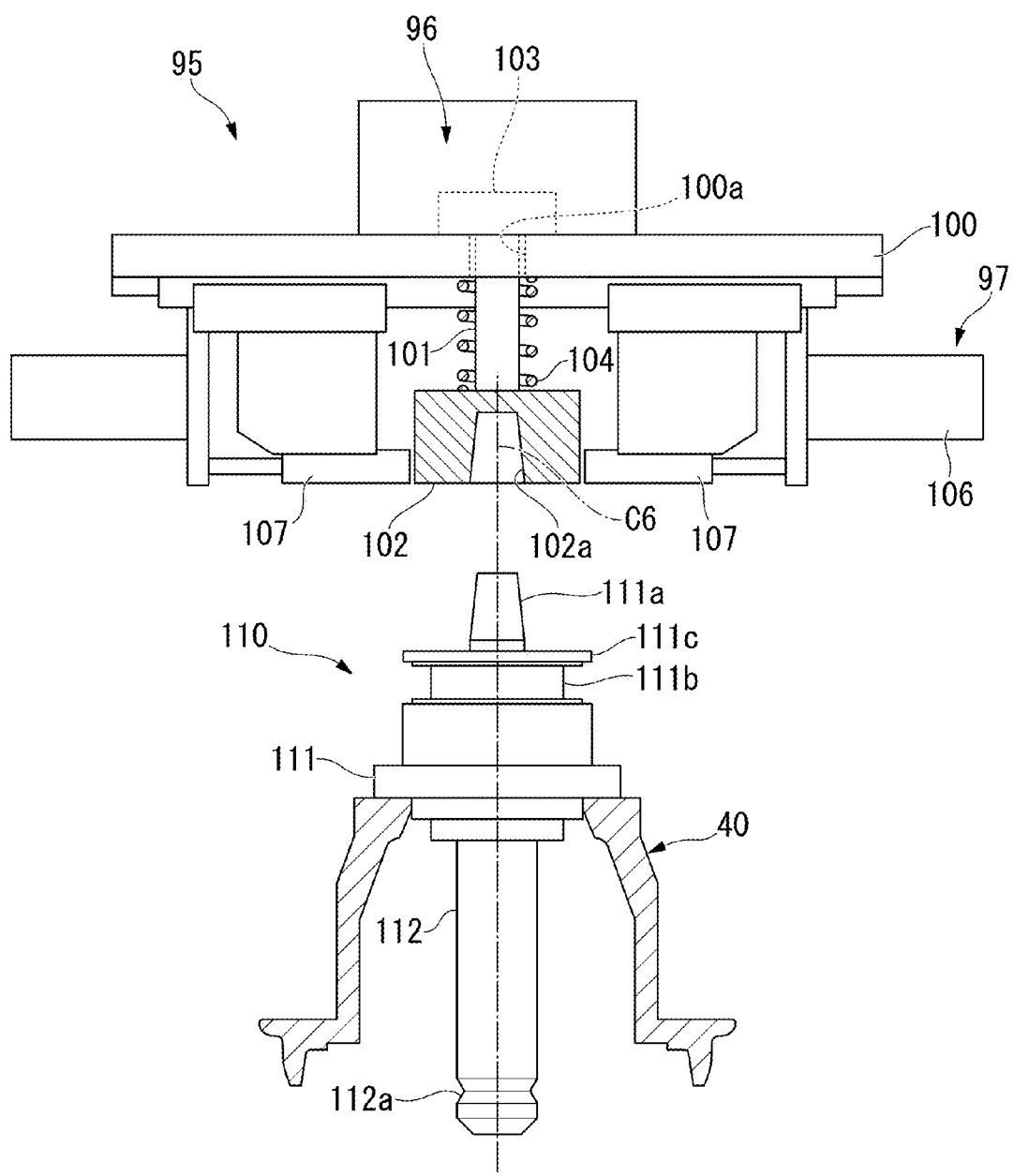
FIG. 17 is a cross-sectional view describing a state where a connecting adapter is detached from a rim lifting and lowering device of the tire uniformity measuring apparatus.

As shown in FIG. 17, the rim lifting and lowering device 95 has a positioning portion 96 and a chuck portion 97.

The positioning portion 96 has a rod 101 inserted through a through hole 100a formed in a supporting plate 100, a substantially disk-shaped positioning member 102 fixed to a lower end of the rod 101, and a supporting member 103 fixed to an upper end of the rod 101.

A lower surface of the positioning member 102 is formed with a second apparatus-side inclined surface 102a that is enlarged in diameter towards the bottom.

A spring 104 through which the rod 101 is inserted is locked to a lower surface of the supporting plate 100 and an upper surface of the positioning member 102, and generates a force to set the supporting plate 100 and the positioning member 102 apart from each other irrespective of the distance between the supporting plate 100 and the positioning member 102.

The external diameter of the supporting member 103 is set to be greater than the external diameter of the through hole 100a. The supporting member 103 is locked to an upper surface of the supporting plate 100.

The chuck portion 97 has an air cylinder 106 for gripping, and a pair of gripping members 107 that are attached to the air cylinder 106 for gripping and are slidable in a direction parallel to the horizontal surface.

Figure 18:
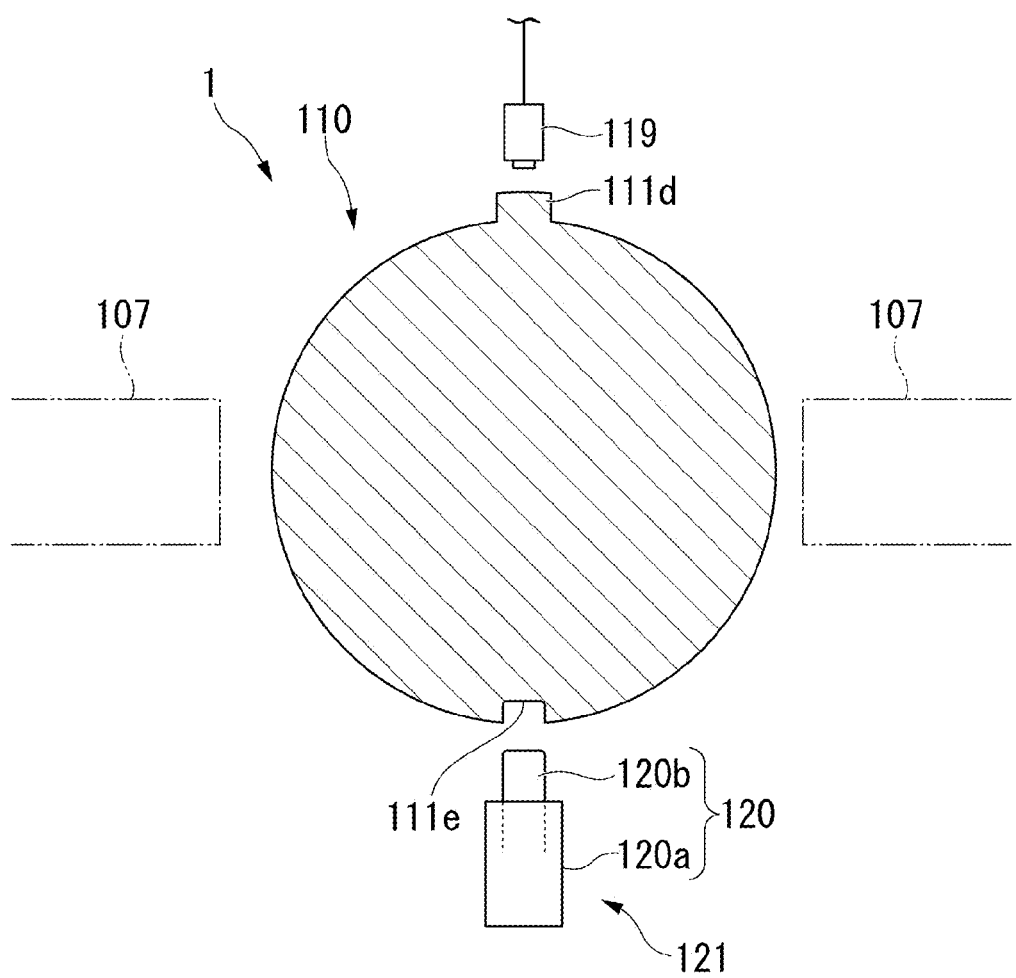
FIG. 18 is a view schematically showing a cross-section taken along a line A3-A3 in FIG. 16.

As shown in FIG. 18, the supporting plate 100 is provided with a well-known upper proximity sensor (second detecting part) 119. The upper proximity sensor 119 can detect whether or not a convex part 111d of the connecting adapter 110, to be described below, is brought close to the upper proximity sensor, similarly to the aforementioned lower proximity sensor 118.

A movable stopper 120 is provided at a position that faces the upper proximity sensor 119 of the supporting plate 100. The movable stopper 120 has a well-known configuration, and can adjust the pressure of air exerted on an air cylinder (engaging portion moving part) 120a to advance and retract a stopper (a portion to be engaged) 120b with respect the air cylinder 120a.

As shown in FIG. 17, the aforementioned positioning portion 96 and chuck portion 97 are attachable to and detachable from the connecting adapter (second attaching part) 110 attached to the upper rim 40.

The connecting adapter 110 has an adapter body 111 detachably attached to the upper rim 40 by bolts or the like (not shown), and an upper rim shaft 112 fixed to a lower portion of the adapter body 111. The adapter body 111 and the upper rim shaft 112 are formed of metal. The adapter body 111 and the upper rim shaft 112 may be integrally formed or may be joined together after being separately formed. The position of the upper rim 40 around the axis C1 with respect to the connecting adapter 110 is uniformly set by the aforementioned bolts.

An upper portion of the adapter body 111 is formed with a second rim-side inclined surface 111a. The second rim-side inclined surface 111a is formed so as to be enlarged in diameter toward the bottom. An outer peripheral surface of the adapter body 111 is formed with an engaging groove 111b that engages the gripping members 107.

A disk-shaped member 111c set to have a greater diameter than the second rim-side inclined surface 111a and the engaging groove 111b is provided between the second rim-side inclined surface 111a and the engaging groove 111b.

As shown in FIG. 18, an edge portion of the disk-shaped member 111c is formed with the convex part 111d that protrudes radially outward, and a concave part (an engaging portion) 111e. The aforementioned stopper 120b can engage the concave part 111e. The convex part 111d and the concave part 111e are formed at positions opposite to each other across the center of the disk-shaped member 111c in a plan view.

A rotation regulating part 121 is constituted by the concave part 111e and the aforementioned movable stopper 120.

As shown in FIG. 17, an outer peripheral surface of a lower end portion of the upper rim shaft 112 is formed with an engaging concave portion 112a that engages the aforementioned engaging claws 87a.

In the chuck portion 97 and the connecting adapter 110, the position of the connecting adapter 110 around the axis C1 can be detected as the connecting adapter 110 rotates around its axis C1 and the upper proximity sensor 119 detects the convex part 111d. A signal when the upper proximity sensor 119 has detected the convex part 111d is transmitted to the control unit. The control unit advances the stopper 120b by the air cylinder 120a of the movable stopper 120, and engages the stopper 120b with the concave part 111e. This regulates the rotation of the connecting adapter 110 around the axis C1 (in the circumferential direction of the connecting adapter 110). Additionally, the regulation can be released from this state by retracting the stopper 120b by the air cylinder 120a.

The upper rim 40 attached to the chuck portion 97 via the connecting adapter 110 is held so that the second reference surface S2 faces the first reference surface S1 of the lower rim 20 attached to the lower spindle 62.

If the hook operating rod 78 is moved upward when the upper rim shaft 112 is inserted into the through hole 79a of the taper sleeve 77 and in between the pair of hooks 87, the internal diameter of the through hole 79a of the taper sleeve 77 becomes small, an upper portion of the upper rim shaft 112 is fixed to the lower spindle 62 via the taper sleeve 77, the engaging claws 87a of the pair of hooks 87 engage the engaging concave portion 112a of the upper rim shaft 112. In this way, the connecting adapter 110 is fixed to the lower spindle 62 by changing the fixing mechanism 76 from the standby state to the fixing state.

On the other hand, as the hook operating rod 78 is moved downward from the fixing state, the taper sleeve 77 moves downward and the internal diameter of the through hole 79a becomes large, the distance between the engaging claws 87a becomes long, and the fixing mechanism 76 is brought into the standby state. This can release the fixation of the lower spindle 62 to the connecting adapter 110.

Since the gap between the through hole 79a and the upper rim shaft 112 is small when the taper sleeve 77 has moved downward, the through hole 79a and the upper rim shaft 112 may come into contact with each other partially.

As shown in FIG. 1, a load wheel 124 is arranged on a rail 123 in the base 61. As the load wheel 124 travels on the rail 123, the load wheel can be brought close to the lower spindle 62 or can be set apart from the lower spindle 62.

In the rim replacement unit 130, as a swivel base 131 travels on the rail 132, the swivel base can be brought close to the lower spindle 62 or can be set apart from the lower spindle 62. An upper portion of the swivel base 131 is provided with a swivel shaft 133. A plurality of stocker frames 134 are connected to the swivel shaft 133. The swivel shaft 133 rotates the stocker frames 134 around the axis of the swivel shaft 133. Thereby, the swivel shaft 133 can bring the rim assembly 10 arranged on rim pedestals 135 of the stocker frames 134 close to the lower spindle 62 or can set the rim assembly apart from the lower spindle 62.

Since the positioning convex portion 69b (refer to FIG. 21) is formed on each stocker frame 134, the phase of the rim assembly 10 arranged on the stocker frame 134 around the axis C1 is positioned.

The operation of the tire measuring apparatus 1 will be described.

A case where a rim assembly 10 to be attached to the body unit 60 is replaced and a case where a tire T is mounted on the rim assembly 10 attached to the body unit 60 so as to perform measurement will be described, respectively. These operations are performed on the basis of control of the control unit.

The case where the rim assembly 10 is replaced will be described.

As shown in FIG. 1, the lower rim 20 and the upper rim 40 are separated from each other. The lower rim 20 is attached to the lower spindle 62, and the connecting adapter 110 fixed to the upper rim 40 is attached to the rim lifting and lowering device 95 and moves upward. At this time, the fixing mechanism 76 within the lower spindle 62 is brought into the standby state, and the load wheel 124 and the swivel base 131 are set apart from the lower spindle 62.

Figure 19:
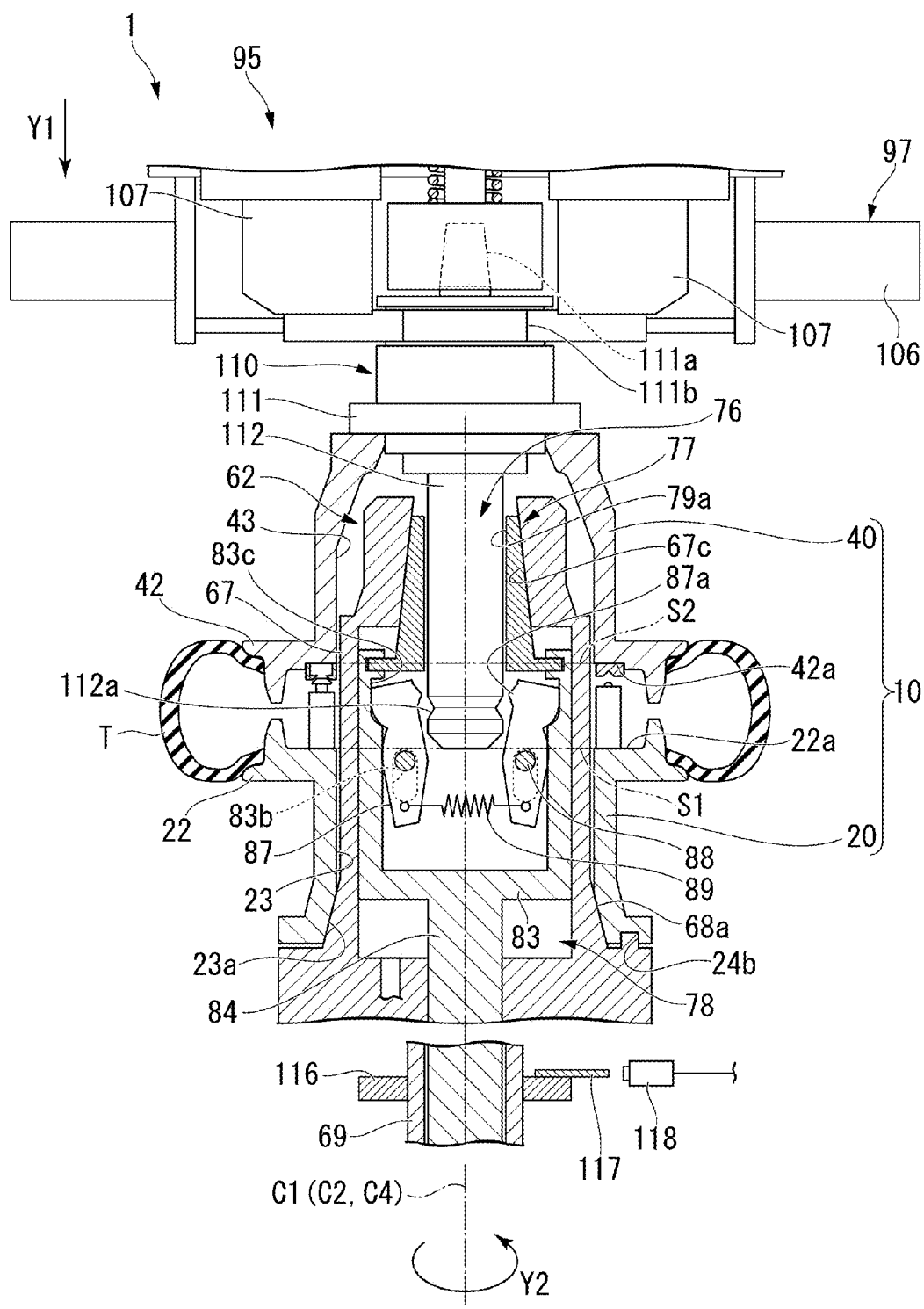
FIG. 19 is a view describing the operation of replacing the rim assembly in the tire uniformity measuring apparatus.

As shown by arrow Y1 of FIG. 19, the rim lifting and lowering device 95 is lowered from this state to move the upper rim 40 downward, and the upper rim shaft 112 is inserted into the taper sleeve 77 of the fixing mechanism 76.

At this time, the phase relationship between both the rims 20 and 40 is arbitrary. At this time, the lower rim 20 and the upper rim 40 are slightly set apart from each other so that the pins 27 or the stands 28 does not come into contact with the pin receiving portions 46 or the stand receiving portions 47.

The hook operating rod 78 is moved upward to bring the fixing mechanism 76 into the fixing state, thereby fixing the lower rim 20 and the upper rim 40 to each other via the lower spindle 62 and the connecting adapter 110 as mentioned above.

If the lower spindle 62 is rotated around the axis C1 by a servo motor 90 as shown by arrow Y2, both the rims 20 and 40 are integrated and rotate around the axis C1.

The upper proximity sensor 119 transmits a signal to the control unit when the sensor has detected the convex part 111d. The control unit stops the driving by the servo motor 90 to stop the lower spindle 62 and the connecting adapter 110.

The hook operating rod 78 is moved downward and is brought into the standby state. At this time, the taper sleeve 77 also moves downward.

The stopper 120b is advanced by the air cylinder 120a of the movable stopper 120, and the stopper 120b is engaged with the concave part 111e. The lower spindle 62 is rotated around the axis C1 by the servo motor 90. Since the rotation of the connecting adapter 110 to which the upper rim 40 is attached is regulated by the stopper 120b, only the lower rim 20 rotates around the axis C1.

The lower proximity sensor 118 transmits a signal to the control unit when the sensor has detected the metal detector 117. The control unit stops the driving by the servo motor 90 to stop the rotation of the lower spindle 62. The phase relationship between both the rims 20 and 40 at this time, as shown in FIG. 8 is such that the pins 27 of the lower rim 20 face the opening portions 48 for insertion of the upper rim 40.

The rim lifting and lowering device 95 is lowered, the upper rim 40 is slightly moved downward, and as shown in FIG. 11, the projection portions 30 of the pins 27 are inserted into the opening portions 48 for insertion. At this time, the stand receiving portions 47 are not caused to contact the stands 28. The lower spindle 62 is rotated around the axis C1 by the servo motor 90, and as shown in FIG. 9, the lower rim 20 is moved up to a position where the convex portions 28b of the stands 28 face the concave portions 54 of the upper rim 40. At this time, the protruding portions 51 of the upper rim 40 are arranged within the groove portions 29 of the pins 27, and the pin receiving portions 46 and the pins 27 engage each other, whereby the lower rim 20 and the upper rim 40 are integrated.

Subsequently, as shown by arrow Y3 of FIG. 20, the rim lifting and lowering device 95 is lifted, and the rim assembly 10 in which both the rims 20 and 40 are integrated are moved upward. At this time, as shown in FIG. 12, since the pin receiving portions 46 of the upper rim 40 support the pins 27, the lower rim 20 are hung from the upper rim 40.

Figure 20:
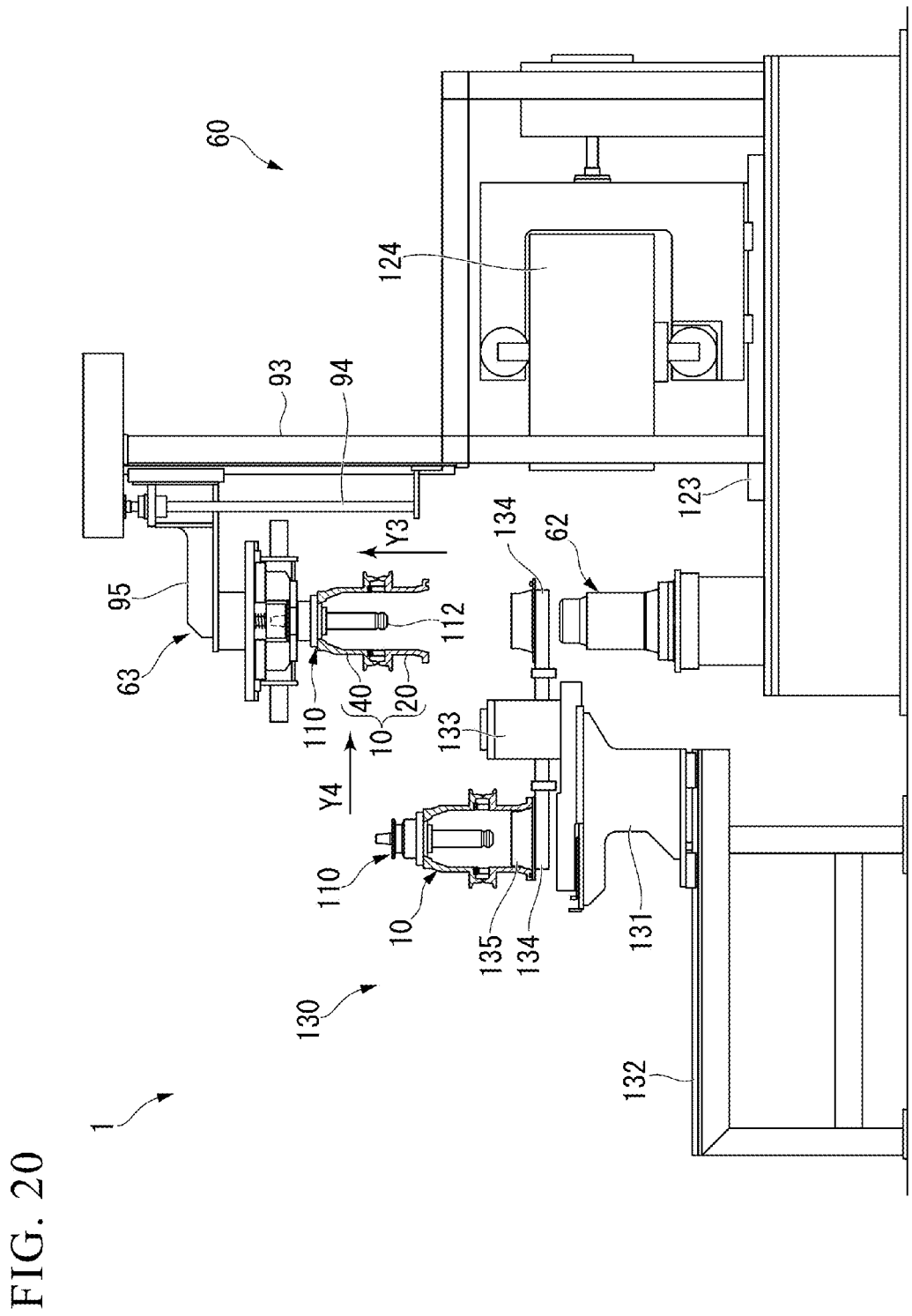
FIG. 20 is a view describing the operation of replacing the rim assembly in the tire uniformity measuring apparatus.

As shown by arrow Y4 of FIG. 20, the rim replacement unit 130 is brought close to the lower spindle 62. At this time, a stocker frame 134, at which no rim assembly 10 is arranged, is arranged below the rim assembly 10 supported by the rim lifting and lowering device 95.

Figure 21:
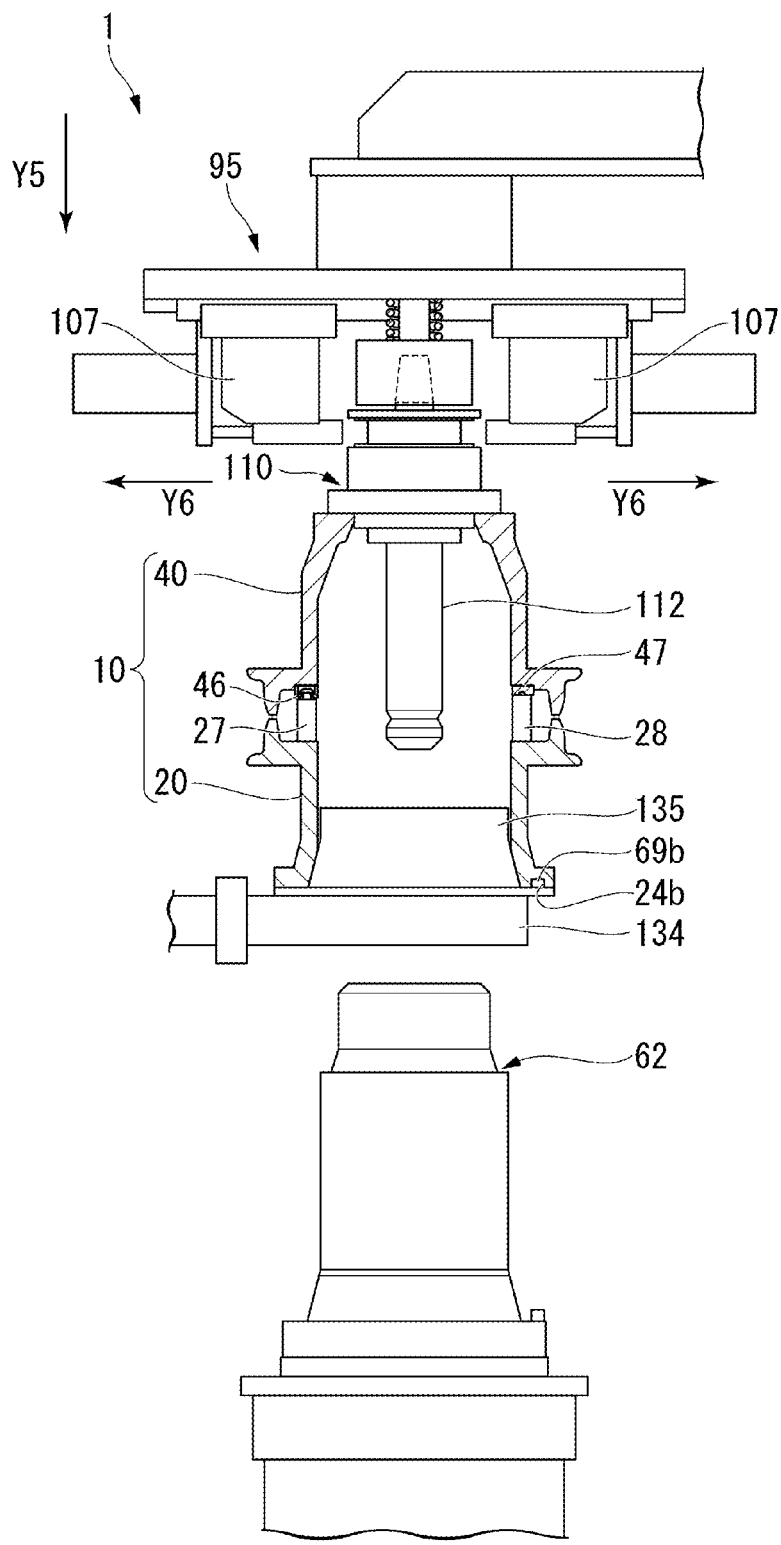
FIG. 21 is a view describing the operation of replacing the rim assembly in the tire uniformity measuring apparatus.
Figure 22:
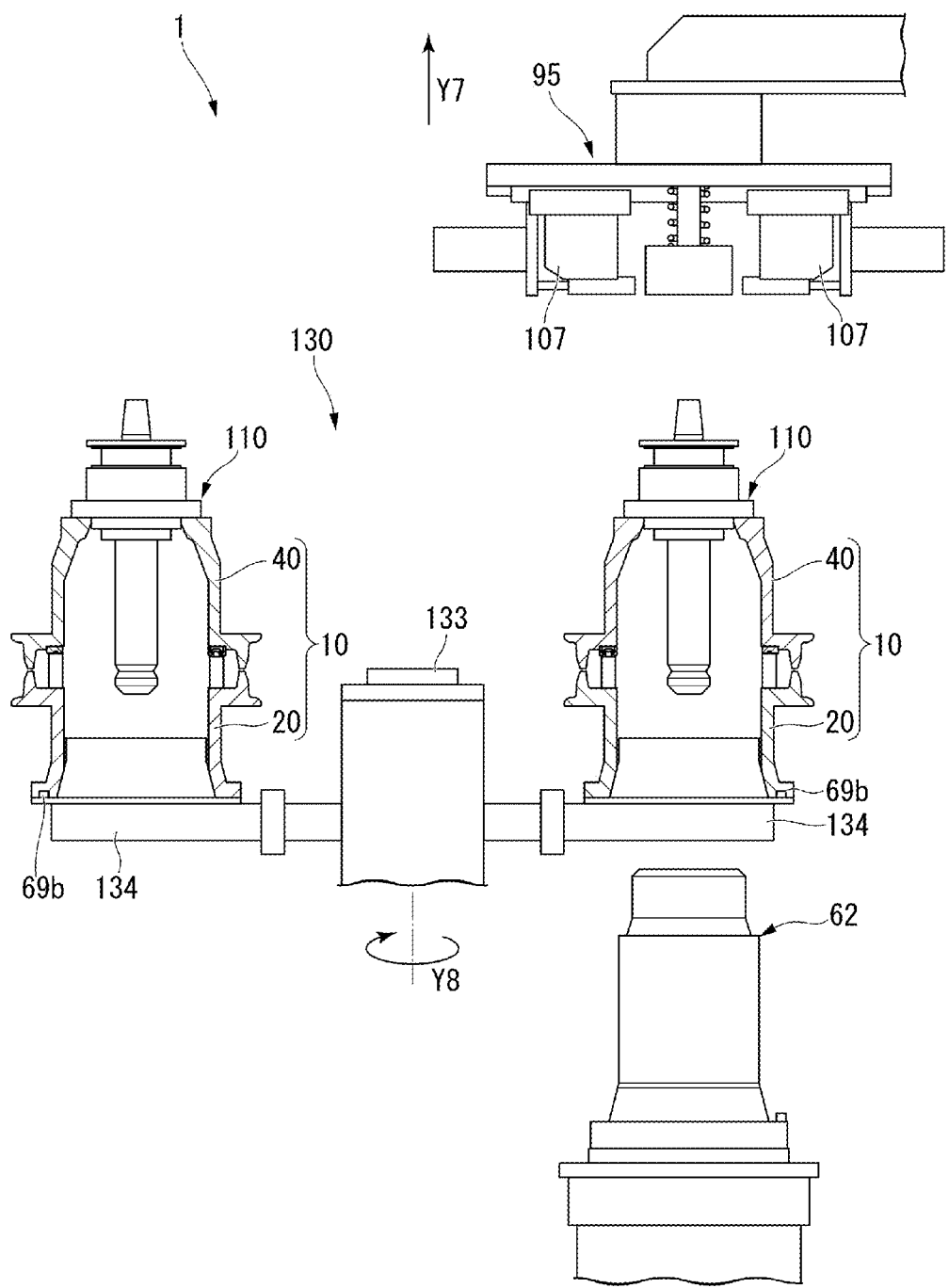
FIG. 22 is a view describing the operation of replacing the rim assembly in the tire uniformity measuring apparatus.

Next, as shown by arrow Y5 of FIG. 21, the rim lifting and lowering device 95 is lowered, and the rim assembly 10 to which the connecting adapter 110 is attached is arranged at the rim pedestal 135 on the stocker frame 134. At this time, the positioning hole portion 24b of the lower rim 20 is engaged with the positioning convex portion 69b that protrudes onto the stocker frame 134.

As a result, the lower rim 20 supports the upper rim 40 in a state where the stand receiving portions 47 contact with the stands 28 and the convex portions 28b of the lower rim 20 engages the concave portions 54 of the upper rim 40. At this time, the pins 27 and the pin receiving portions 46 do not interfere with each other and the pins 27 do not support the load of the upper rim 40, so that damage to the pins 27 can be prevented.

If the rim assembly 10 is arranged on the stocker frame 134, as shown by arrow Y6 of FIG. 21, the pair of gripping members 107 that support the connecting adapter 110 are moved so as to be set apart from each other, and the rim assembly 10 is detached from the rim lifting and lowering device 95. As shown by arrow Y7 of FIG. 22, the rim lifting and lowering device 95 is lifted and set apart from the rim replacement unit 130.

Thereafter, as shown by arrow Y8, the stocker frame 134 is rotated around the axis of the swivel shaft 133, and a rim assembly 10 of a type that is different from the rim assembly 10 attached to the body unit 60 up to now is located below the rim lifting and lowering device 95.

Figure 23:
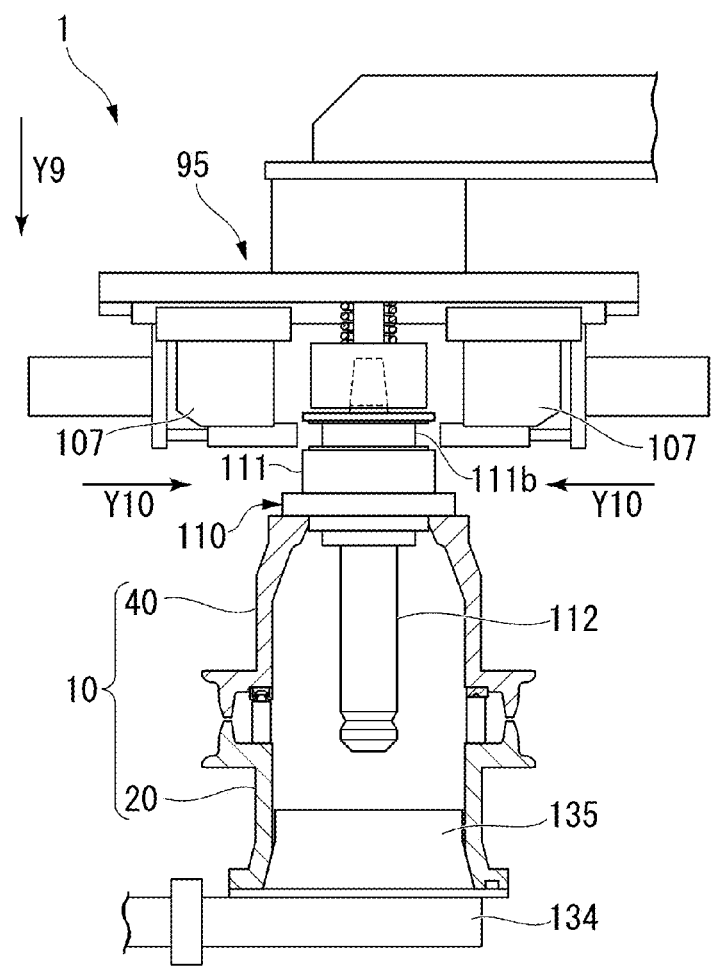
FIG. 23 is a view describing the operation of replacing the rim assembly in the tire uniformity measuring apparatus.

Next, as shown by arrow Y9 of FIG. 23, the rim lifting and lowering device 95 is lowered, and the gripping members 107 are moved so as to grip the engaging groove 111b of the adapter body 111. As shown by arrow Y10, the gripping members 107 are brought close to each other and the engaging groove 111b is engaged with the gripping members 107. At this time, the lower rim 20 and the upper rim 40 of the rim assembly 10 are engaged with each other.

Figure 24:
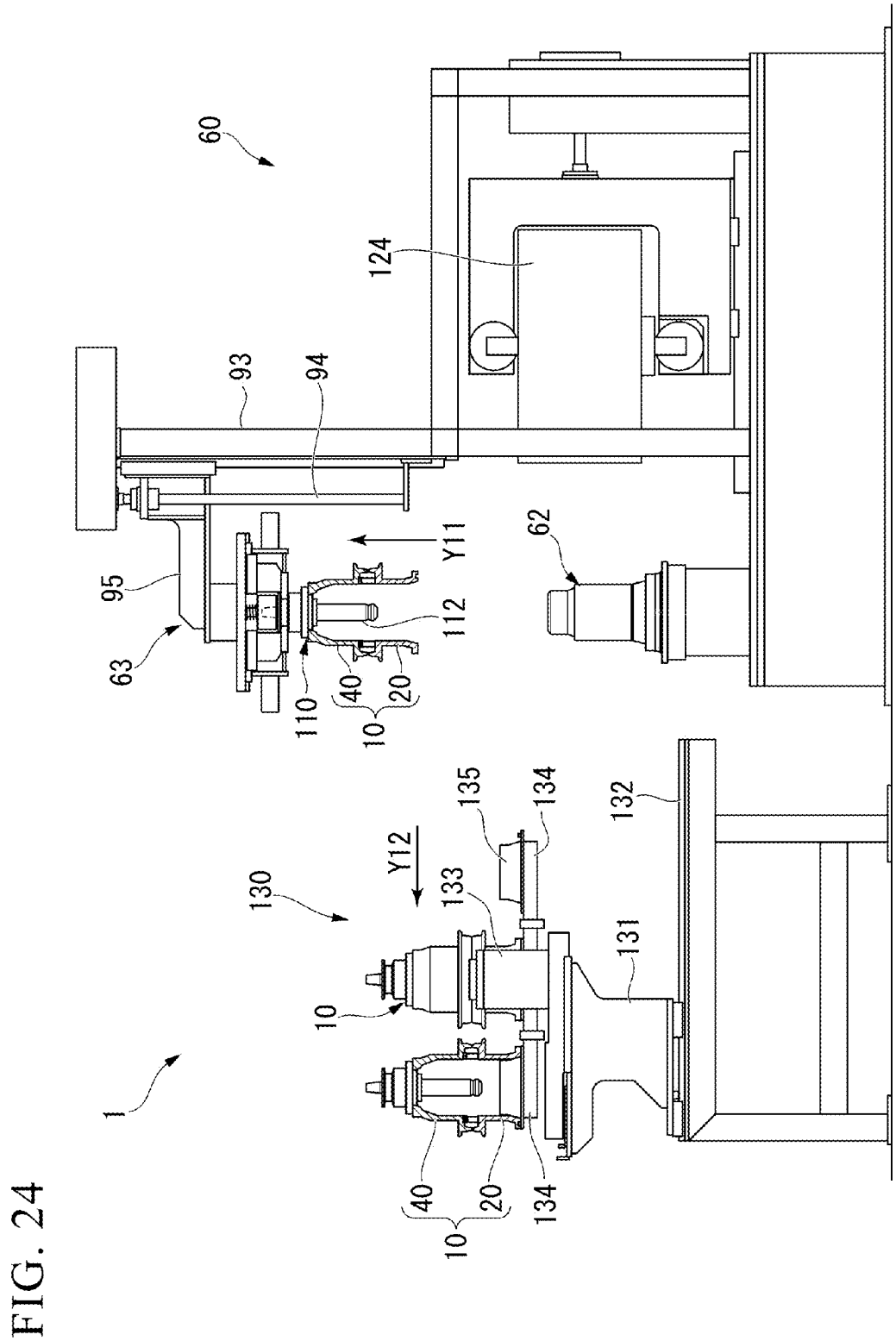
FIG. 24 is a view describing the operation of replacing the rim assembly in the tire uniformity measuring apparatus.

As shown by arrow Y11 of FIG. 24, the rim lifting and lowering device 95 engaged with the rim assembly 10 is lifted. As shown by arrow Y12, the rim replacement unit 130 is set apart from the lower spindle 62, and the stocker frame 134 of the rim replacement unit 130 is retracted from above the lower spindle 62.

Figure 25:
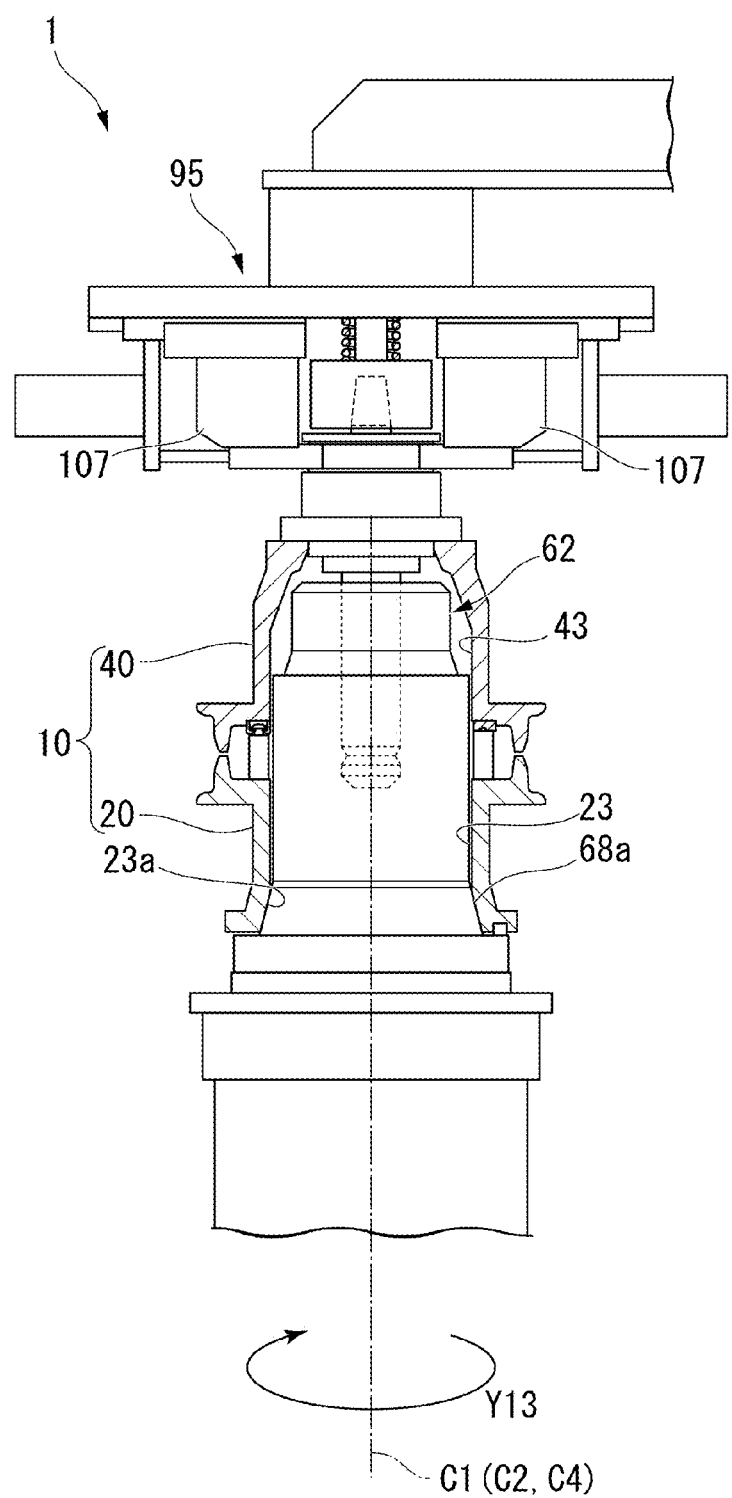
FIG. 25 is a view describing the operation of replacing the rim assembly in the tire uniformity measuring apparatus.

Subsequently, as shown in FIG. 25, the rim lifting and lowering device 95 is lowered and the rim assembly 10 is attached to the lower spindle 62. At this time, the lower spindle 62 is inserted into the lower through hole 23 of the lower rim 20 and the upper through hole 43 of the upper rim 40.

The rim-side inclined surface 23a of the lower rim 20 is caused to contact the apparatus-side inclined surface 68a of the lower spindle 62, and the rim assembly 10 is supported by the apparatus-side inclined surface 68a. At this time, since the lower spindle 62 is inserted through the lower through hole 23 and the upper through hole 43, respectively, the lower rim 20 and the upper rim 40 is suppressed from tilting with respect to the axis C4 of the lower spindle 62.

As shown by arrow Y13, the lower spindle 62 is rotated in the clockwise direction around the axis C4 in a plan view, and the lower rim 20 is rotated with respect to the upper rim 40. At this time, the phase relationship between the upper rim 40 and the lower rim 20 is as shown in FIGS. 8 and 11. The projection portions 30 of the pins 27 reach the opening portions 48 for insertion by the clockwise rotation of the lower rim 20. This can release the engagement between the pin receiving portions 46 and the pins 27. By lifting the rim lifting and lowering device 95, the pins 27 can be set apart from the pin receiving portions 46, and as shown in FIG. 1, the rim assembly 10 can be separated into the lower rim 20 and the upper rim 40.

The case where the tire T is mounted on the rim assembly 10 to perform measurement will be described.

As shown in FIG. 16, the tire T is arranged on the collar portion 22 of the lower rim 20 from a state where the tire measuring apparatus 1 is as shown in FIG. 1.

The rim lifting and lowering device 95 is lowered to a predetermined rim width for tire measurement. At this time, the upper rim shaft 112 is inserted into the through hole 79a of the taper sleeve 77 of the fixing mechanism 76 and inserted between the pair of hooks 87.

The hook operating rod 78 is moved upward to bring the fixing mechanism 76 into the fixing state, and the lower spindle 62, the rim assembly 10, and the connecting adapter 110 are integrated.

Next, by supplying air by the air supply source 73, to discharge air from the hole portion for a tire (not shown), the air within the tire T is caused to reach a predetermined pressure, and the tire T is caused to fit both the rims 20 and 40.

If the lower spindle 62 is rotated by the servo motor 90, the tire T rotates around the axis C4 together with the rim assembly 10 and the connecting adapter 110. The load wheel 124 is brought close to the lower spindle 62 and brought into contact with the tire T, and the distribution of the load that acts on the tire T is measured.

As described above, according to the tire measuring apparatus 1 of the present embodiment, the lower rim 20 is attached to the lower spindle 62, and the upper rim 40 is attached to the connecting adapter 110. In the tire measuring apparatus 1, the lower spindle 62 and the connecting adapter 110 can be fixed to each other by the fixing mechanism 76 in a state where the first reference surface S1 and second reference surface S2 are caused to face each other.

On the other hand, in the tire measuring apparatus 1, when the fixation by the fixing mechanism 76 is released, the lower spindle 62 is rotated around the axis C1 by the servo motor 90 in a state where the rotation of the connecting adapter 110 around the axis C1 is regulated by the rotation regulating part 121. Thereby, in the tire measuring apparatus 1, even in a case where a frictional force or the like acts between the taper sleeve 77 of the fixing mechanism 76, and the connecting adapter 110, the lower rim 20 attached to the lower spindle 62 can be rotated around the axis C1 while fixing the upper rim 40 attached to the connecting adapter 110. In the tire measuring apparatus 1, the connecting adapter 110 is brought close to the lower spindle 62 by the rim lifting and lowering device 95 after the lower spindle 62 is rotated so that the pins 27 face the opening portions 48 for insertion. In the tire measuring apparatus 1, by rotating the lower spindle 62 around the axis C1 by the servo motor 90, the groove portions 29 of the pins 27 can be engaged with the protruding portions 51 of the pin receiving portions 46 and the lower rim 20 can be attached to the upper rim 40.

The rotation regulating part 121 is constituted by the concave part 111e and the movable stopper 120. In the tire measuring apparatus 1, the connecting adapter 110 can be freely rotated around the axis C1 by retracting the stopper 120b from the disk-shaped member 111c by the air cylinder 120a.

On the other hand, in the tire measuring apparatus 1, the rotation of the connecting adapter 110 around the axis C1 can be regulated by bringing the stopper 120b close to the disk-shaped member 111c by the air cylinder 120a and being engaged with the concave part 111e in the circumferential direction of the connecting adapter 110. In this way, in the tire measuring apparatus 1, whether the rotation of the connecting adapter 110 is regulated or not can be easily switched by adjusting the position of the stopper 120b.

Additionally, in the tire measuring apparatus 1, the rotation of the connecting adapter 110 around the axis C1 can be regulated with a simple configuration of the concave part 111e and the movable stopper 120. Thus, the manufacturing costs of the tire measuring apparatus 1 can be kept down.

The tire measuring apparatus 1 includes the lower proximity sensor 118 and the upper proximity sensor 119.

In the tire measuring apparatus 1, when the connecting adapter 110 is rotated around the axis C1 by the servo motor 90 in a state where the lower spindle 62 and the connecting adapter 110 are fixed to each other by the fixing mechanism 76, the positions of both the rims 20 and 40 around the axis C1 can be detected by the upper proximity sensor 119 in a state where the lower rim 20 and the upper rim 40 are integrated.

In the tire measuring apparatus 1, when the fixation by the fixing mechanism 76 is released, and the lower spindle 62 is rotated around the axis C1 by the servo motor 90 in a state where the rotation of the connecting adapter 110 around the axis C1 is regulated by the rotation regulating part 121, the positions of the lower spindle 62 around the axis C1 can be detected by the lower proximity sensor 118.

Although one embodiment of the present invention has been described above in detail with reference to the drawings, specific configuration is not limited to this embodiment, and changes of the configuration are also included without departing from the scope of the present invention.

For example, in the embodiment, the lower rim 20 is formed with the pins 27 and the upper rim 40 is formed with the pin receiving portions 46. However, a configuration in which the lower rim is formed with the pin receiving portions 46 and the upper rim is formed with the pins 27 may be adopted. Even if the lower rim and the upper rim are configured in this way, the same effects as the above embodiment can be exhibited.

Additionally, the first rim is the lower rim 20 and the second rim is the upper rim 40. However, the first rim may be the upper rim and the second rim may be the lower rim. In this case, the first attaching part attached to the upper rim is rotated around the axis by the rotating part, and the rotation of the second attaching part attached to the lower rim around the axis is regulated by the rotation regulating part.

Figure 26:
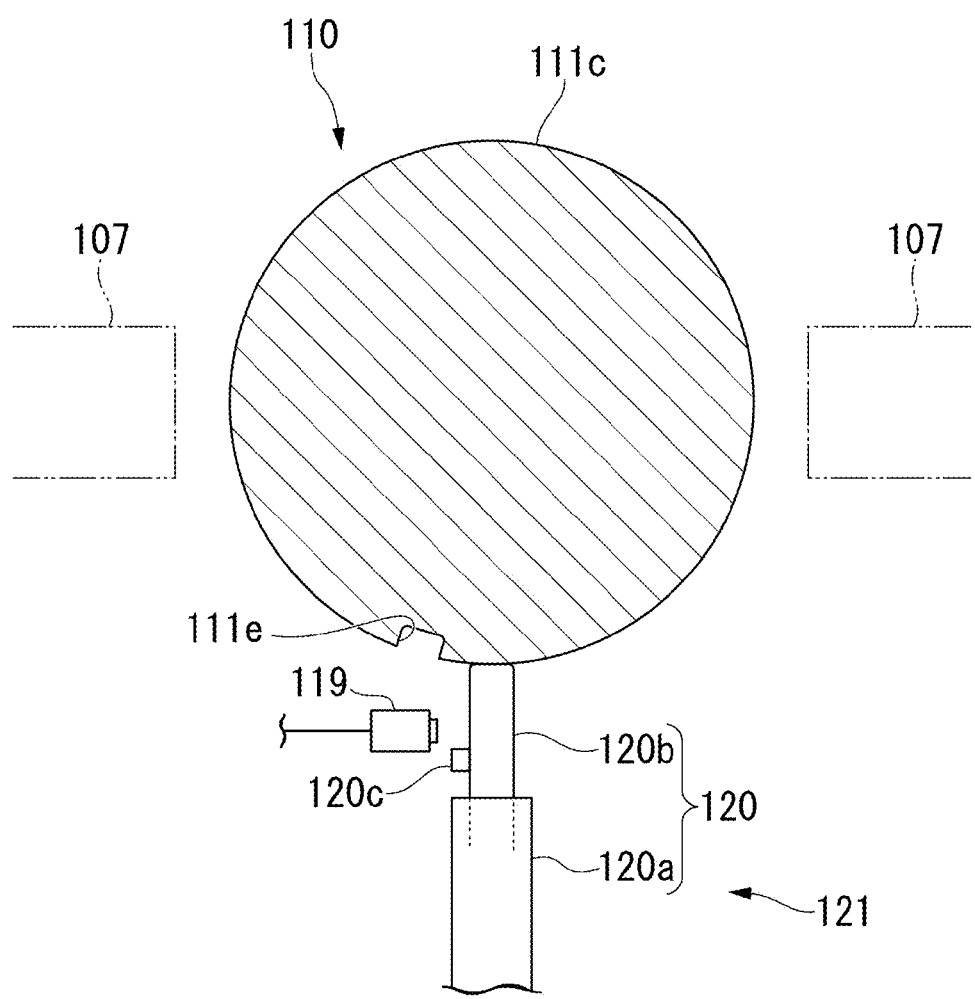
FIG. 26 is a cross-sectional view schematically showing main portions in a modified example of the tire uniformity measuring apparatus of the present embodiment.

In the embodiment, the convex part 111d to be detected by the upper proximity sensor 119 is provided on the connecting adapter 110. However, as shown in FIG. 26, instead of the convex part 111d, the stopper 120b may be provided with a concave portion 120c. The concave portion 120c is formed of metal. In this case, for example, the stopper 120b is biased by the air cylinder 120a so as to always move forward. Although the upper proximity sensor 119 does not detect the concave portion 120c while the tip of the stopper 120b is contacting with the edge portion of the disk-shaped member 111c, the upper proximity sensor is arranged at a position where the sensor detects the concave portion 120c when the stopper 120b has moved forward and engages the concave part 111e.

When the regulation by the rotation regulating part 121 is released, the control unit retracts the stopper 120b from the disk-shaped member 111c by the air cylinder 120a.

In the above embodiment, proximity sensors that can detect the metal detector 117 or the convex part 111d in non-contact are used as the first detecting part and the second detecting part. However, these detecting parts are not limited to the proximity sensors, and non-contact type or contact-type sensors can be appropriately selected and used. The non-contact-type sensors that can be used include line sensors, encoders, or the like, and the contact-type sensors include electric contact points that mechanically switch ON/OFF.

Additionally, in the above embodiment, the lower proximity sensor 118 and the upper proximity sensor 119 may not be provided in a case where an operator or the like of the tire measuring apparatus 1 operates the tire measuring apparatus 1 while seeing the position of the lower spindle 62 or the connecting adapter 110 around the axis C1.

Additionally, in the above embodiment, the tire testing apparatus 1 is the tire uniformity measuring apparatus. However, the tire testing apparatus is not limited to this, and may be a tire balance measuring apparatus or the like.

INDUSTRIAL APPLICABILITY

The present invention relates to the tire testing apparatus that prevents the second rim from rotating together with the first rim when the first rim is rotated around the axis in a state where the fixation by the fixing part is released.

The invention claimed is:

1. A tire testing apparatus that allows attachment and detachment of a rim assembly and performs testing of a tire attached to the rim assembly, wherein the rim assembly includes a first rim having a pin that is erected from a first reference surface and has a groove portion formed around an outer peripheral surface thereof, and a second rim having a protruding portion that is provided on a second reference surface and is engageable with the groove portion, and wherein the protruding portion is engaged with the groove portion as the first and second rims are rotated relative to each other in a state where the second reference surface is caused to face the first reference surface, the tire testing apparatus comprising:
  a first attaching part that holds the first rim;
  a second attaching part that holds the second rim so that the second reference surface faces the first reference surface of the first rim attached to the first attaching part;
  a rotating part that rotates the first attaching part around a reference axis orthogonal to the first reference surface of the first rim attached to the first attaching part;
  a fixing part that fixes the first attaching part and the second attaching part to each other and is configured to release a fixation of the first attaching part and the second attaching part;
  an attaching portion moving part that adjusts the distance in a direction along the reference axis between the first attaching part and the second attaching part; and
  a rotation regulating part that regulates rotation of the second attaching part around the reference axis and is configure to release a regulation of the second attaching part,
  wherein the rotation regulating part includes:
    a disk-shaped member provided in the second attaching part;
    an edge portion of the disk-shaped member formed with a concave part;
    a stopper that is engaging with the concave part in a circumferential direction; and
    an engaging portion moving part that advances and retracts the concave part with respect to the stopper.

2. The tire testing apparatus according to claim 1, further comprising:
  a first detecting part that detects the position of the first attaching part around the reference axis; and
  a second detecting part that detects the position of the second attaching part around the reference axis.

3. A tire testing apparatus that allows attachment and detachment of a rim assembly and performs testing of a tire attached to the rim assembly, wherein the rim assembly includes a first rim having a protruding portion that is provided on a first reference surface, and a second rim having a pin that is erected from a second reference surface and has a groove portion engageable with the protruding portion formed around an outer peripheral surface thereof, and wherein the protruding portion is engaged with the groove portion as the first and second rims are rotated relative to each other in a state where the second reference surface is caused to face the first reference surface, the tire testing apparatus comprising:
  a first attaching part that holds the first rim;
  a second attaching part that holds the second rim so that the second reference surface faces the first reference surface of the first rim attached to the first attaching part;
  a rotating part that rotates the first attaching part around a reference axis orthogonal to the first reference surface of the first rim attached to the first attaching part;
  a fixing part that fixes the first attaching part and the second attaching part to each other and is configured to release a fixation of the first attaching part and the second attaching part;
  an attaching portion moving part that adjusts the distance in a direction along the reference axis between the first attaching part and the second attaching part; and
  a rotation regulating part that regulates rotation of the second attaching part around the reference axis and is configure to release a regulation of the second attaching part;
  wherein the rotation regulating part includes:
    a disk-shaped member provided in the second attaching part;
    an edge portion of the disk-shaped member formed with a concave part;
    a stopper that is engaging with the concave part in a circumferential direction; and
    an engaging portion moving part that advances and retracts the concave part with respect to the stopper.

4. The tire testing apparatus according to claim 3, further comprising:
  a first detecting part that detects the position of the first attaching part around the reference axis; and
  a second detecting part that detects the position of the second attaching part around the reference axis.

* * * * *